(12) United States Patent
McKillop et al.

(10) Patent No.: US 6,745,103 B1
(45) Date of Patent: Jun. 1, 2004

(54) MACHINE AND SYSTEM FOR PACKAGING FOOD PRODUCTS

(75) Inventors: Brian Eugene McKillop, Finksburg, MD (US); Romano Balordi, Millers, MD (US); William John Searle, Glen Burnie, MD (US)

(73) Assignee: Sweetheart Cup Company Inc., Owings Mills, MD (US)

( * ) Notice: Subject to any disclaimer, the term of this patent is extended or adjusted under 35 U.S.C. 154(b) by 0 days.

(21) Appl. No.: 10/273,380

(22) Filed: Oct. 17, 2002

Related U.S. Application Data

(60) Provisional application No. 60/330,210, filed on Oct. 17, 2001.

(51) Int. Cl.[7] ............................................. G06F 7/00
(52) U.S. Cl. ..................................... 700/230; 700/239
(58) Field of Search ................................. 700/230, 231, 700/239; 53/202, 201

(56) References Cited

U.S. PATENT DOCUMENTS

| | | | | | |
|---|---|---|---|---|---|
| 4,548,244 A | * | 10/1985 | Risko et al. | ................ | 141/156 |
| 4,552,190 A | * | 11/1985 | Wilson et al. | ................ | 141/82 |
| 5,041,907 A | * | 8/1991 | Sager et al. | .................. | 348/91 |
| 5,170,611 A | * | 12/1992 | Buchko et al. | ............... | 53/453 |
| 5,629,863 A | * | 5/1997 | Palozzi et al. | .............. | 700/239 |
| 6,219,996 B1 | * | 4/2001 | Searle | ........................ | 53/282 |

* cited by examiner

Primary Examiner—Gene O. Crawford
(74) Attorney, Agent, or Firm—Jones Day

(57) ABSTRACT

A machine and system are disclosed for filling containers with food products, such as liquid and semi-solid dairy products. The machine is driven by solenoid-controlled pneumatics and a servo-motor, all of which can be controlled by computer. The machine and system provide greater flexibility in changing the machine over from one product to another. The system also allows remote monitoring of the operation of the machine.

21 Claims, 40 Drawing Sheets

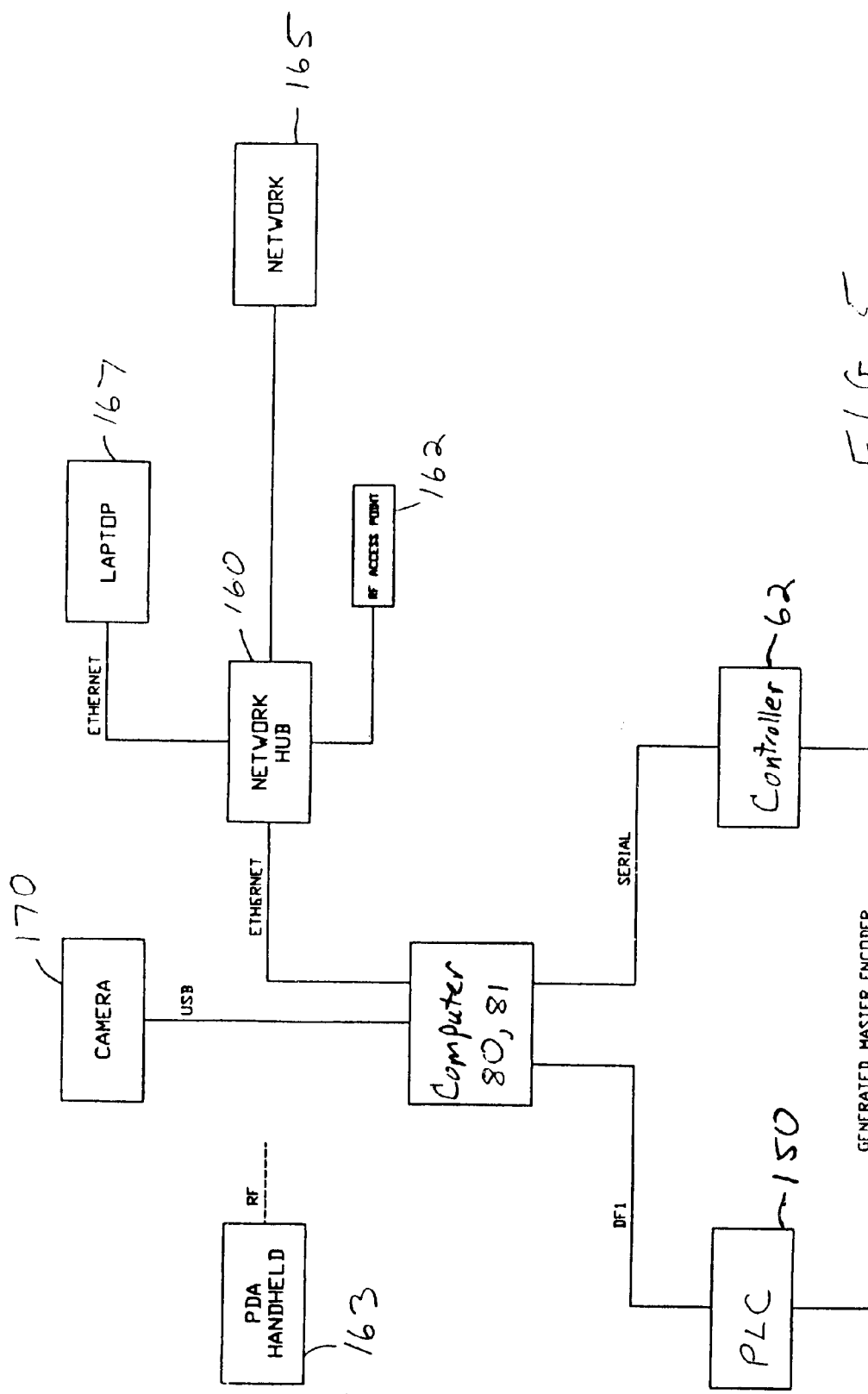

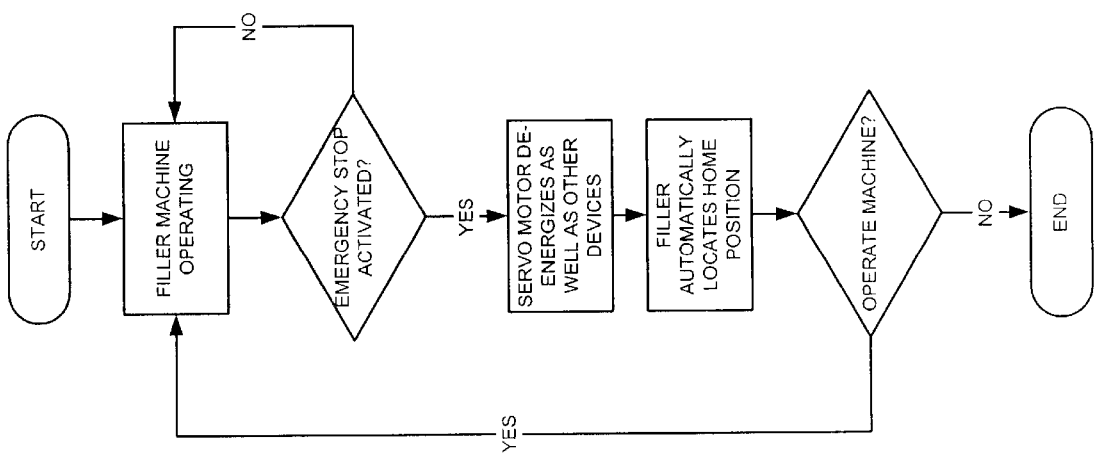

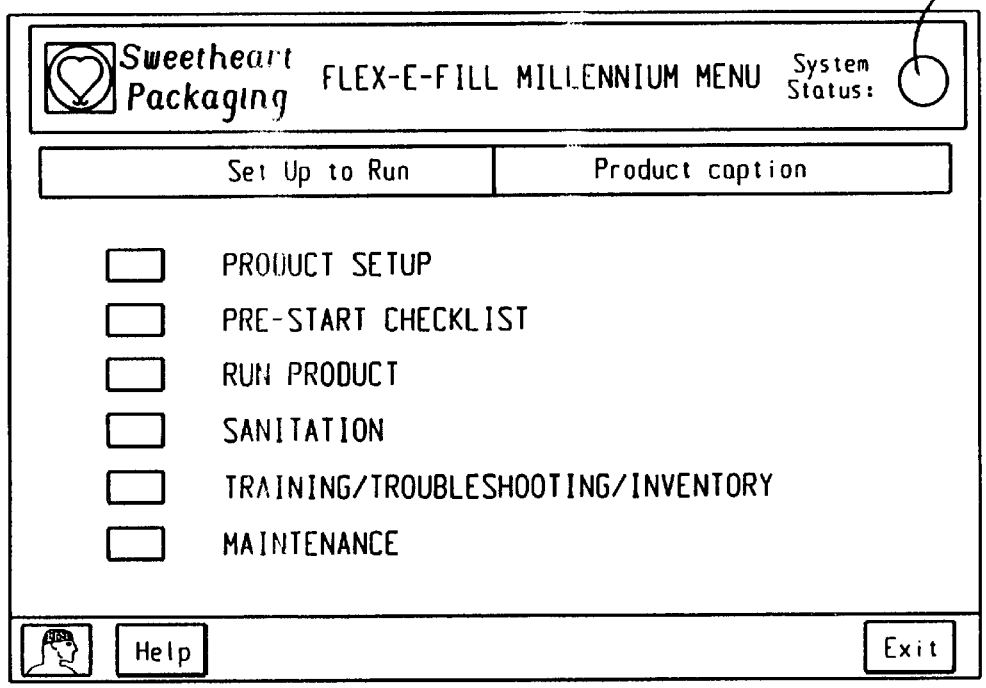
Screen 1.0    FIG. 12
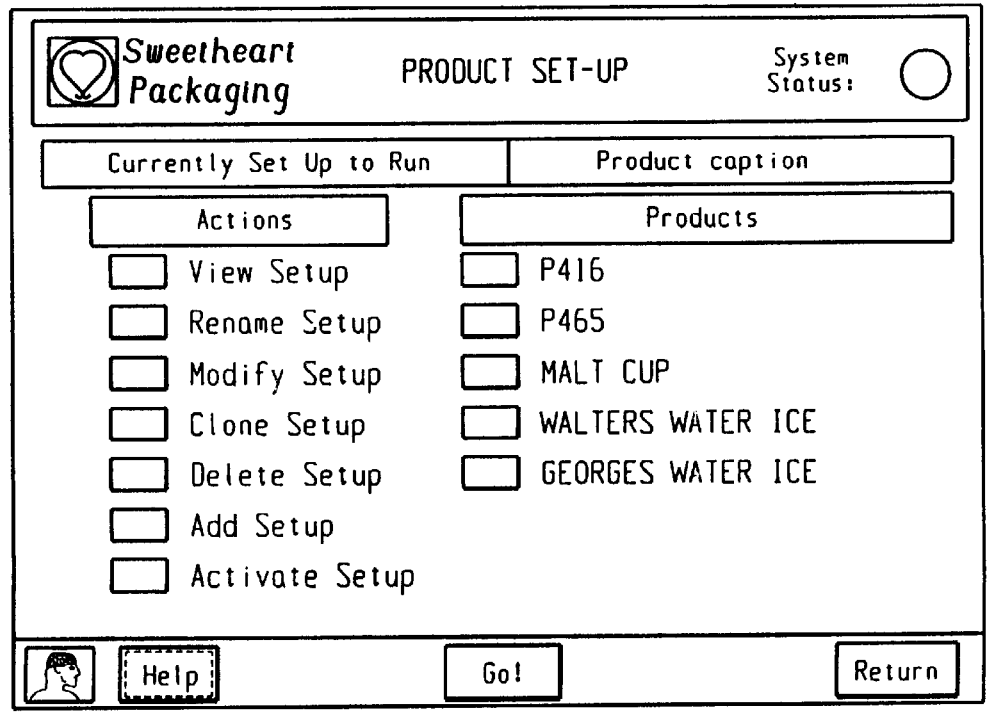
Screen 2.1    FIG. 13

Sweetheart Packaging — PRE-START CHECK LIST — Status Caption

SWEETHEART PACKAGING EQUIPMENT
DAILY OPERATOR'S PRE-START CHECKLIST

1. Clean entire area around the machine to remove potential safety hazards
2. Clear Machine completely of tools, clamps, or other foreign objects
3. Make visual check that machine appears level. Adjust leveling screws if necessary
4. Lubricate all exposed shafts and bearings
5. Select the jog cycle and move machine through several complete cycles
6. Verify the proper operation of all electrical and operational switches Help | Return Screen 2.2   FIG. 14

---

Sweetheart Packaging — SANITATION PROCEDURES — Status Caption

FLEX-E-FILL

SANITATION and CLEAN-UP PROCEDURES

1. Make sure that the machine is not running (use Lock-out/Tag-out)
2. Remove any remaining cups and lids from their dispensers
3. Rinse the entire exterior of the machine
4. Disassemble all product dispensing and filling valves
5. Seperate PLASTIC parts from STAINLESS STEEL parts
6. Wash and sanitize STAINLESS STEEL PARTS ONLY in COP Tank
7. Wash and sanitize all plastic parts according to the procedure below, including all O-rings:

Help | Return

Screen 2.4   FIG. 16

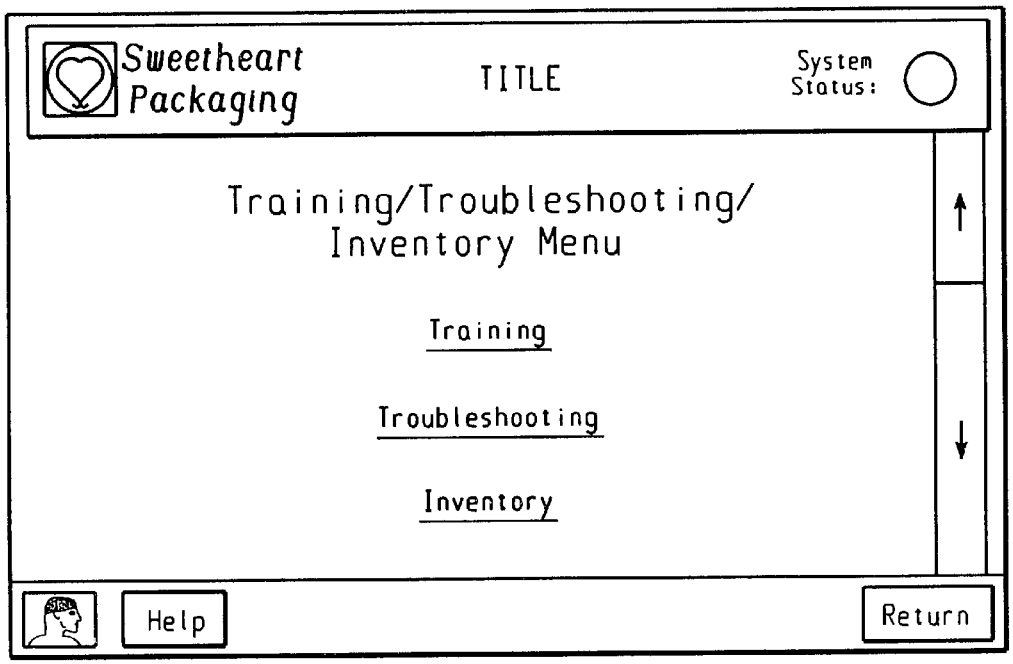
Screen 2.5  FIG. 17
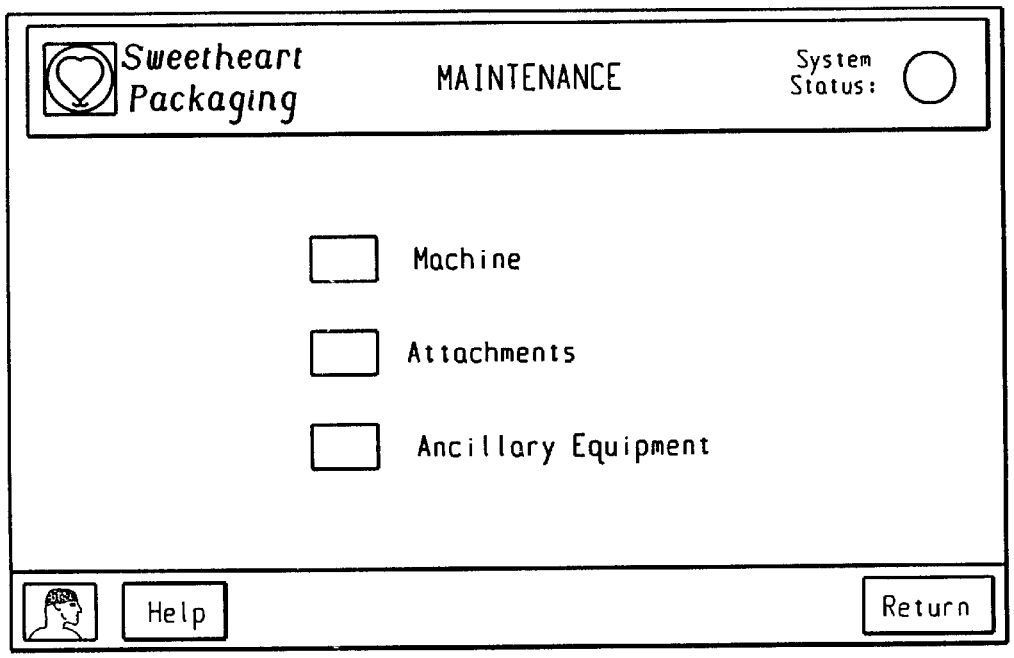
Screen 2.6  FIG. 18

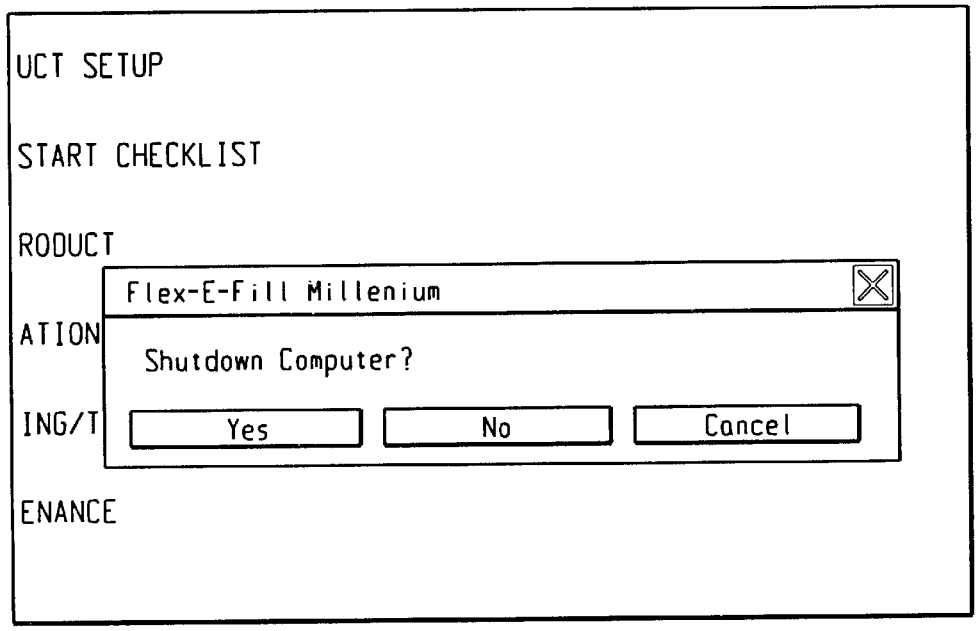
Screen 2.7    FIG. 19
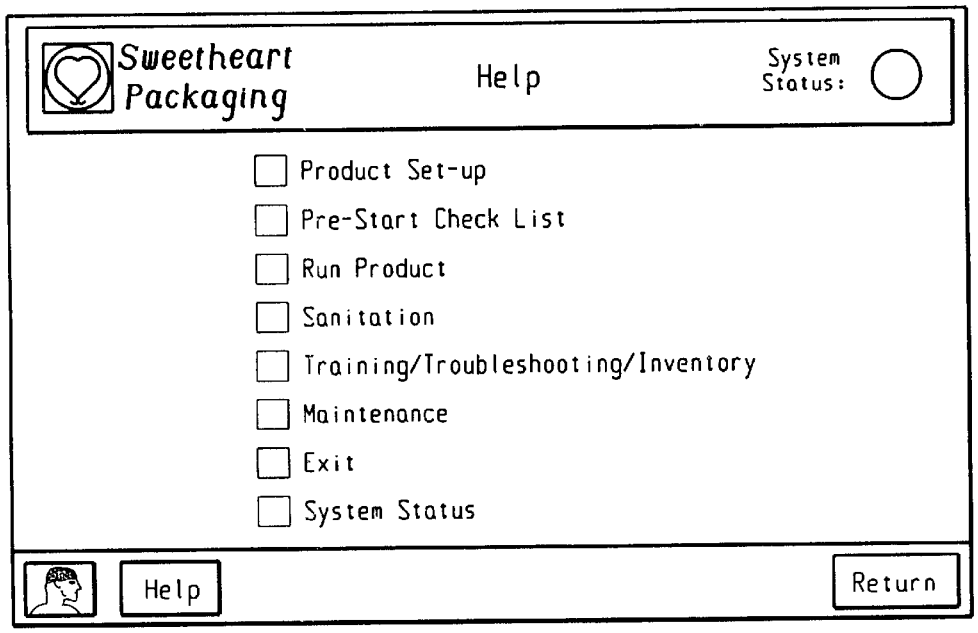
Screen 2.8    FIG. 20

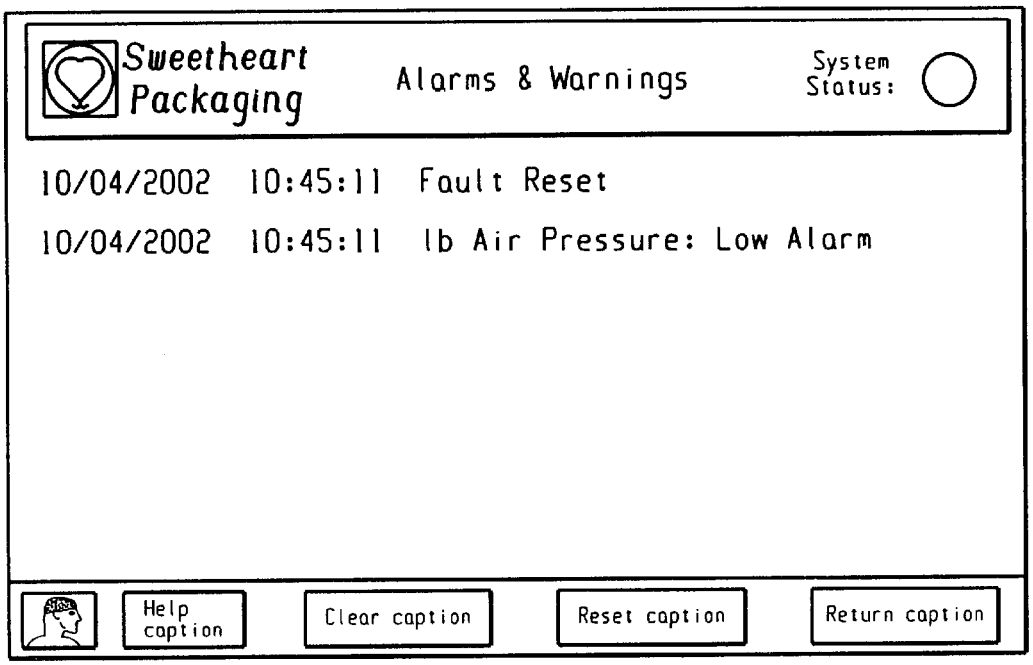
Screen 2.9   FIG. 21
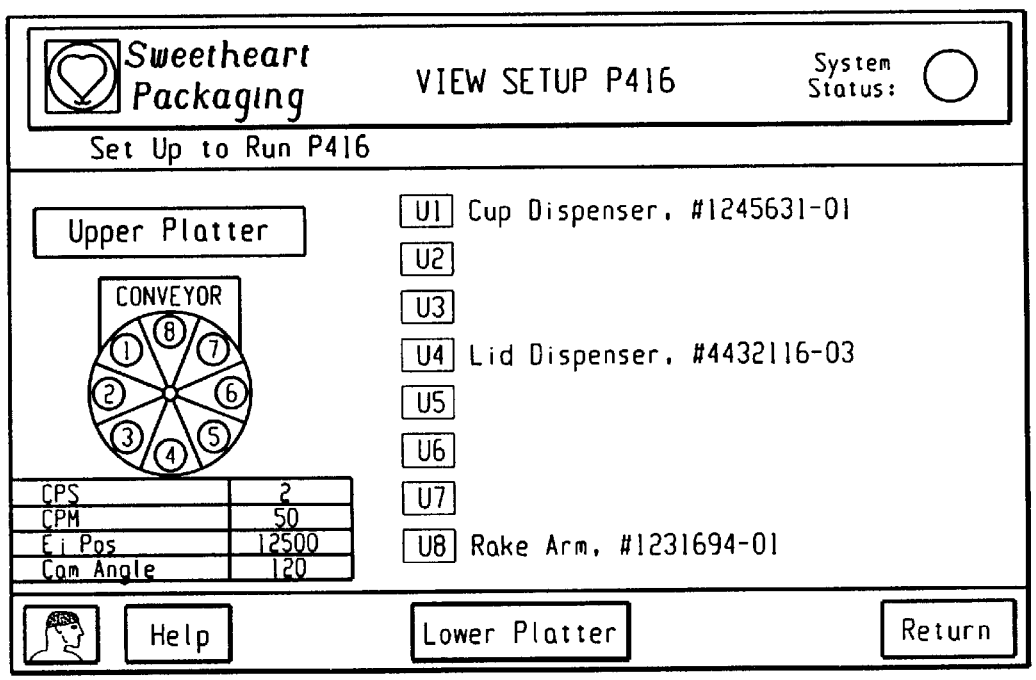
Screen 3.1   FIG. 22

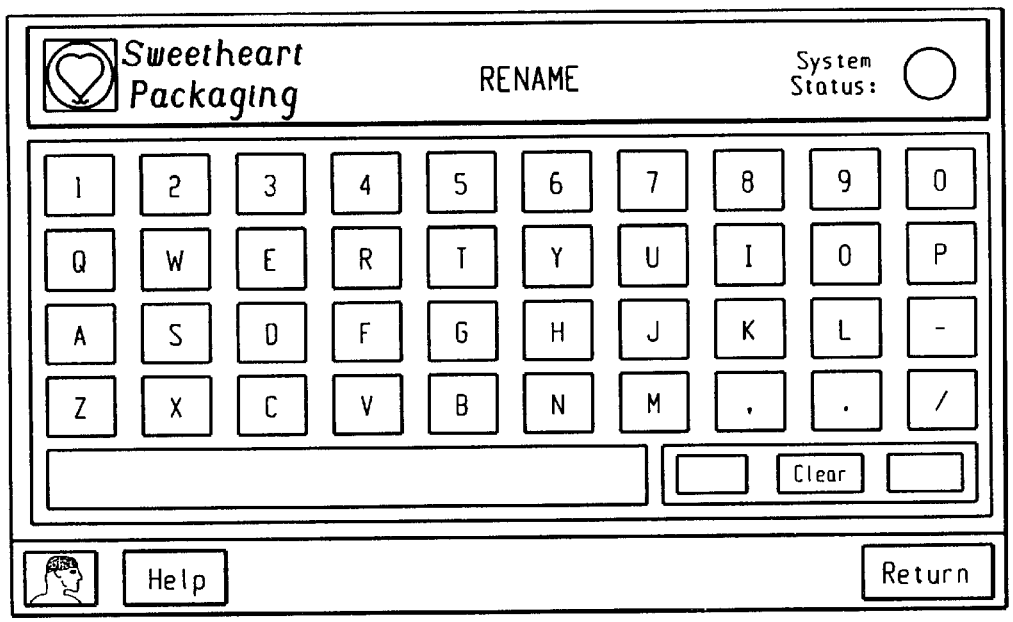
Screen 3.2   FIG. 23
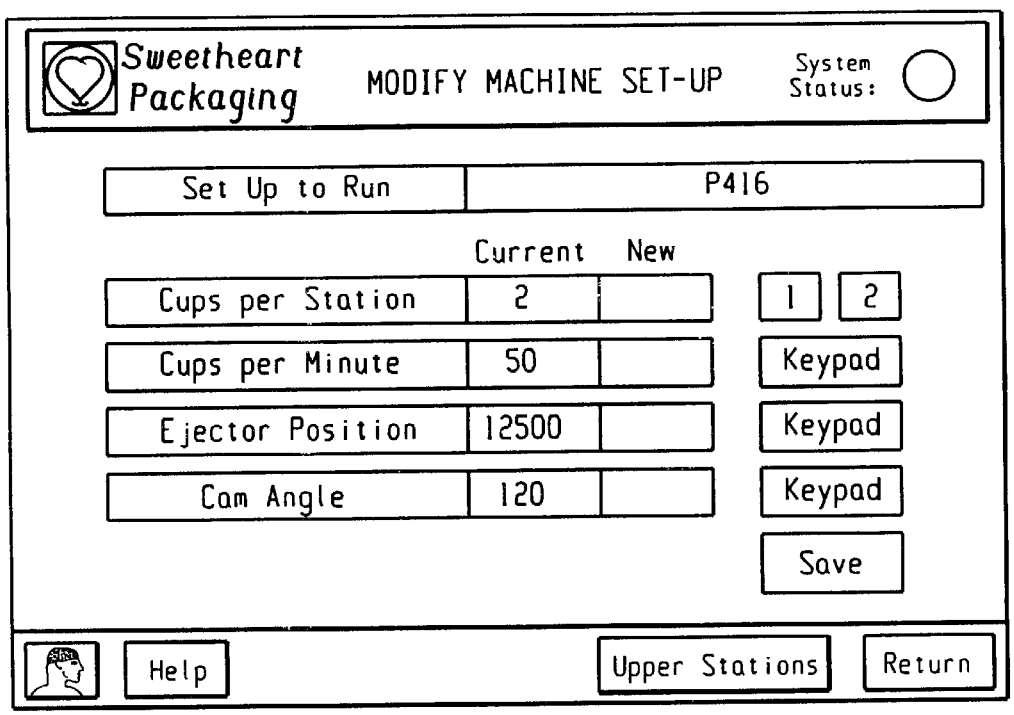
Screen 3.3   FIG. 24

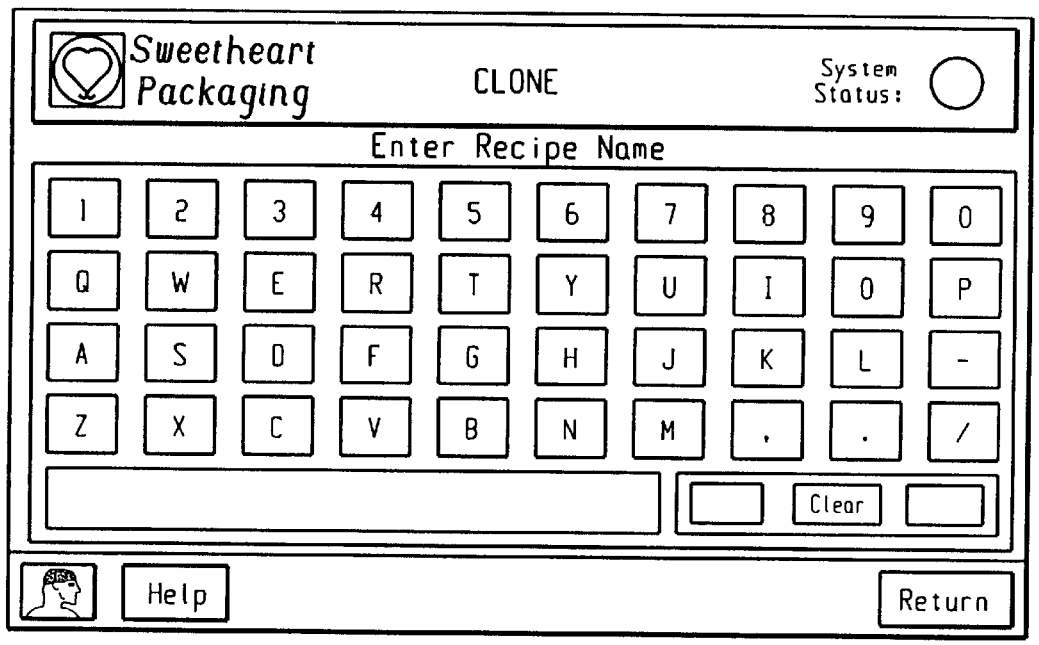
Screen 3.4    FIG. 25
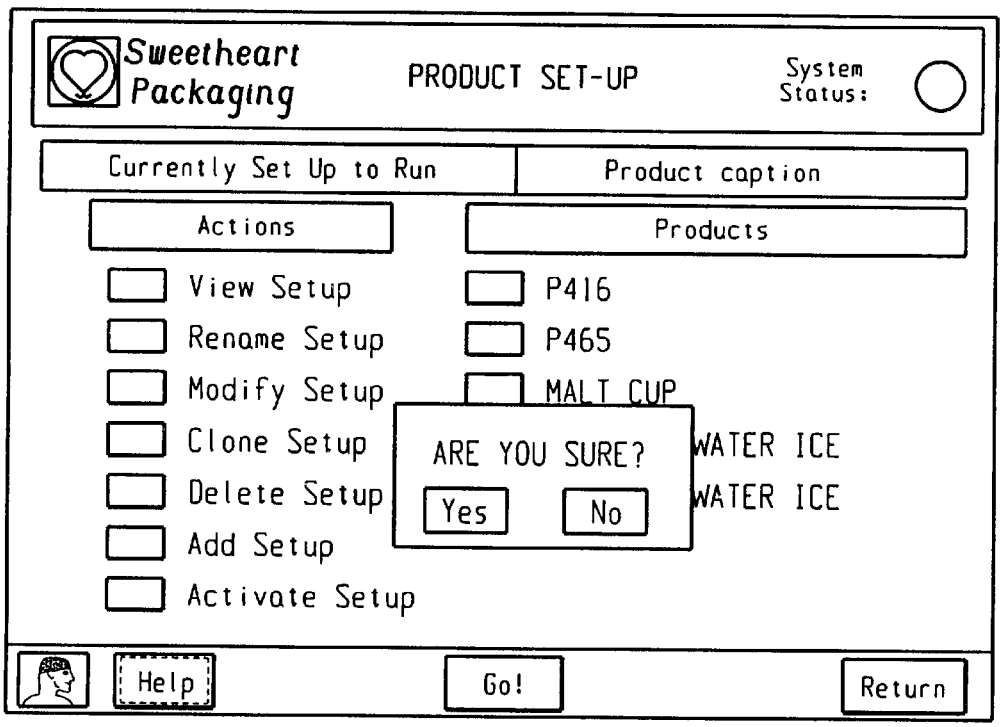
Screen 3.5    FIG. 26

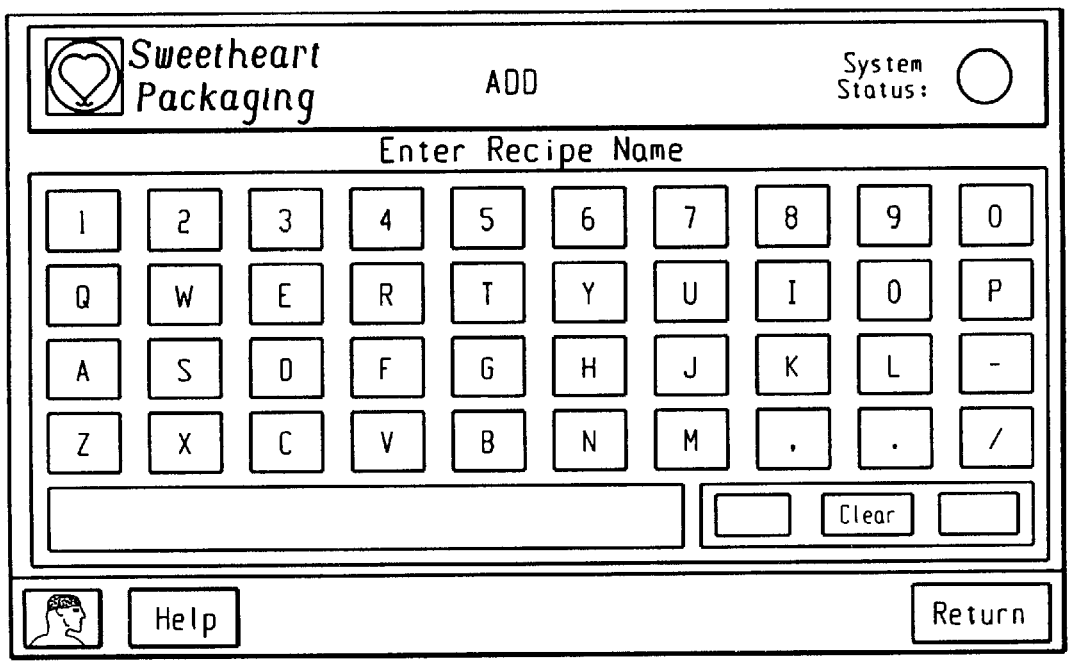
Screen 3.6  FIG. 27
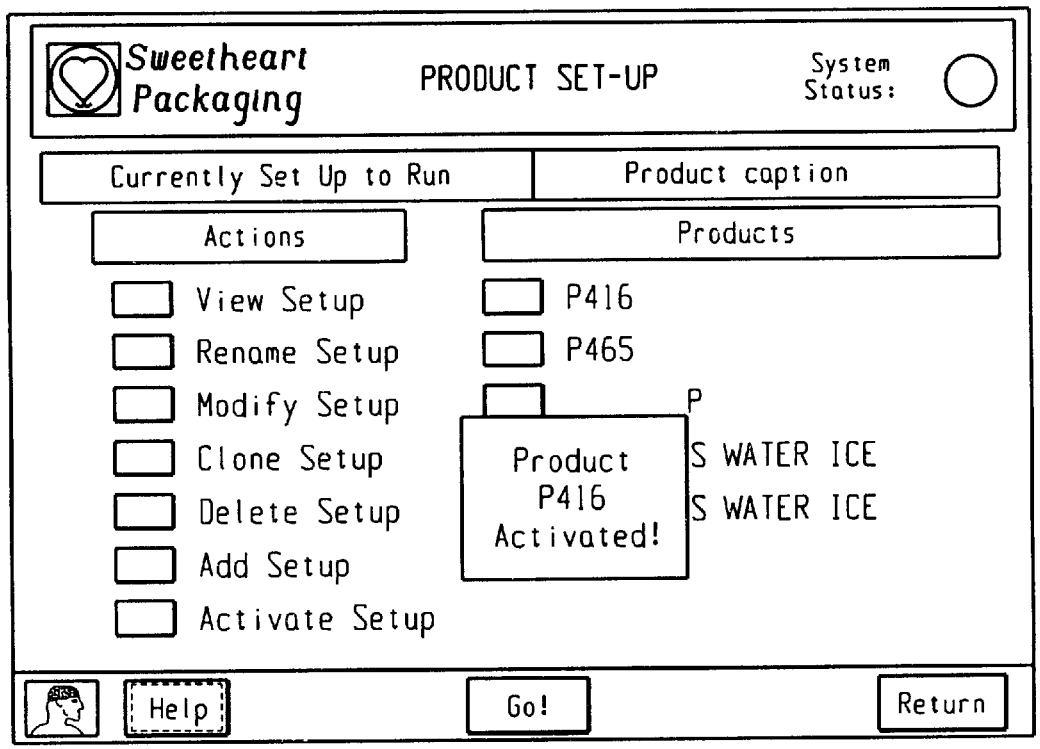
Screen 3.7  FIG. 28

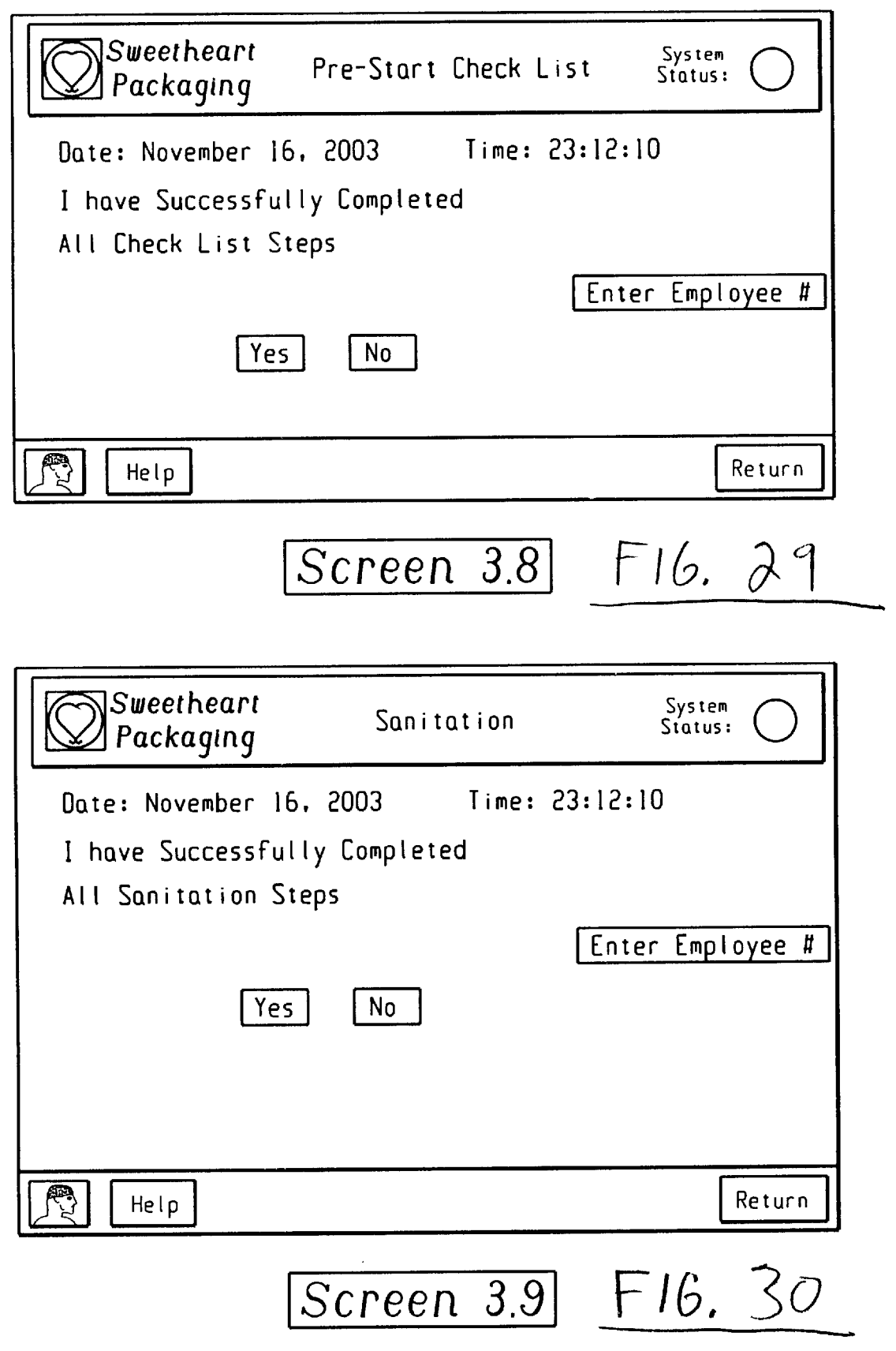

Screen 3.8 FIG. 29

Screen 3.9 FIG. 30

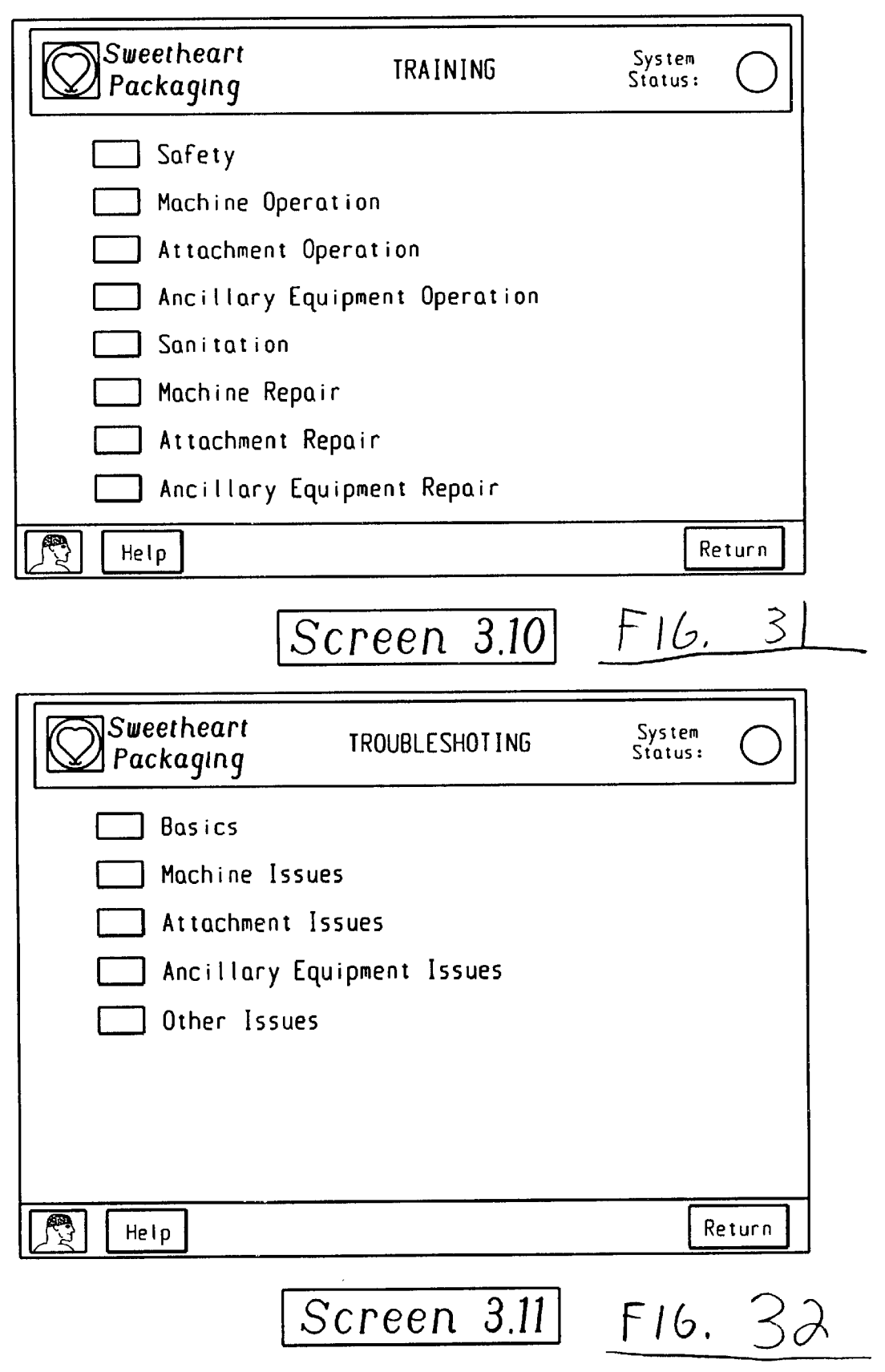

Screen 3.10 FIG. 31

Screen 3.11 FIG. 32

Screen 3.12    FIG. 33
Screen 3.14    FIG. 35

Sweetheart Packaging — Maintenance

Machine

- ☐ Daily
  - ☐ Main Drive Unit
  - ☐ Oil Pump
  - ☐ Sump Tank

- ☐ Weekly
  - ☐ Shuttle guide rods
  - ☐ Upper Timken Rods
  - ☐ Conveyor Chain
  - ☐ Counter Shaft
  - ☐ Oil Pump Guide Rods
  - ☐ Lower Power Unit
  - ☐ Rod Guides

- ☐ Monthly
  - ☐ Operators
  - ☐ Variable Speed Pulleys
  - ☐ Upper Varible
  - ☐ Lower Varible
  - ☐ Wheels
  - ☐ Slide Block and Guides

[Help]  [Return to Menu]  [Return]

Screen 3.13   Fig. 34

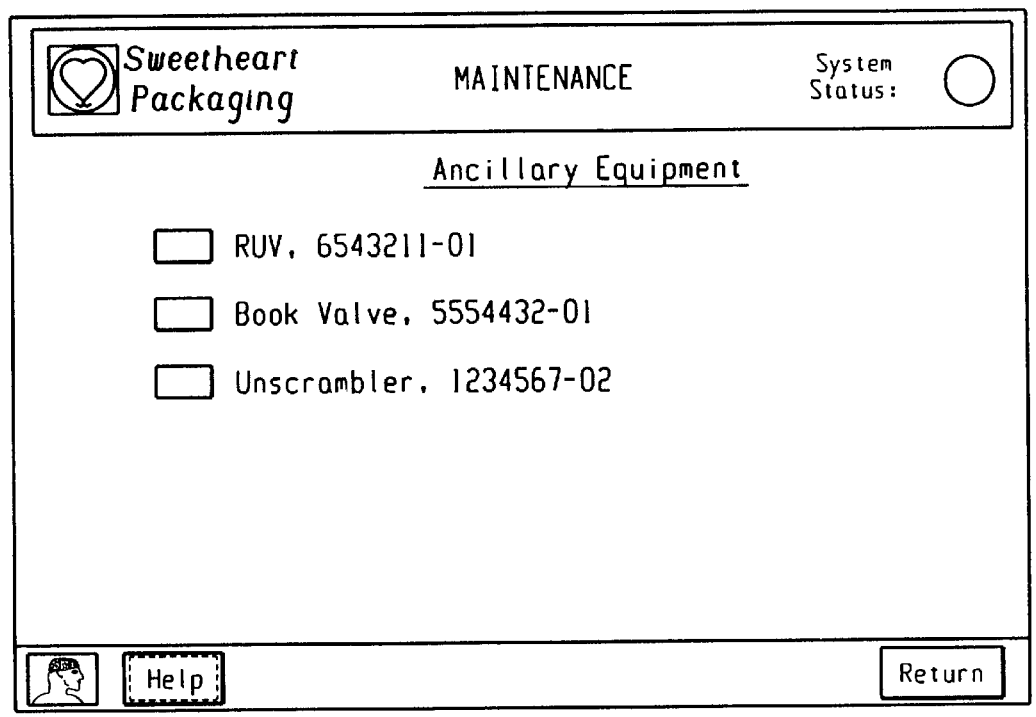
Screen 3.15   FIG. 36
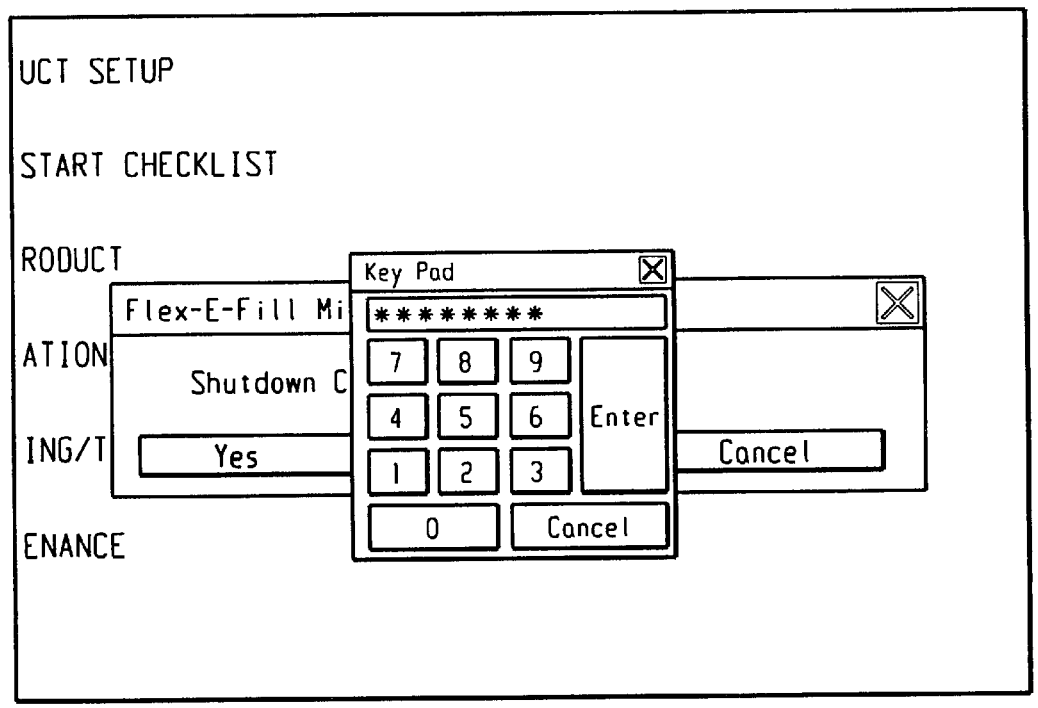
Screen 3.16   FIG. 37

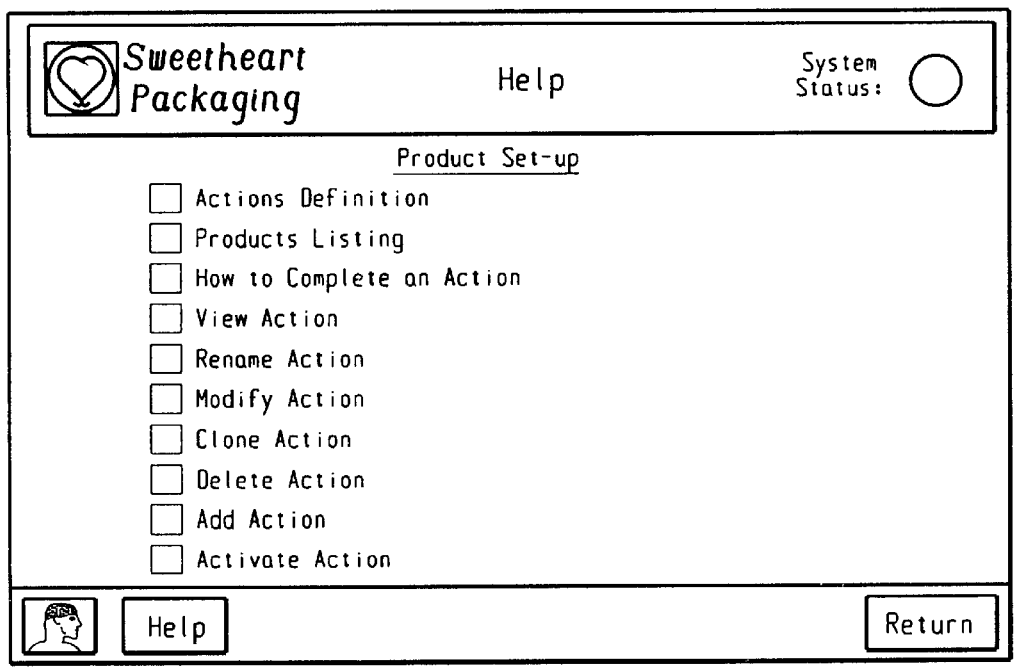
Screen 3.17  FIG. 38
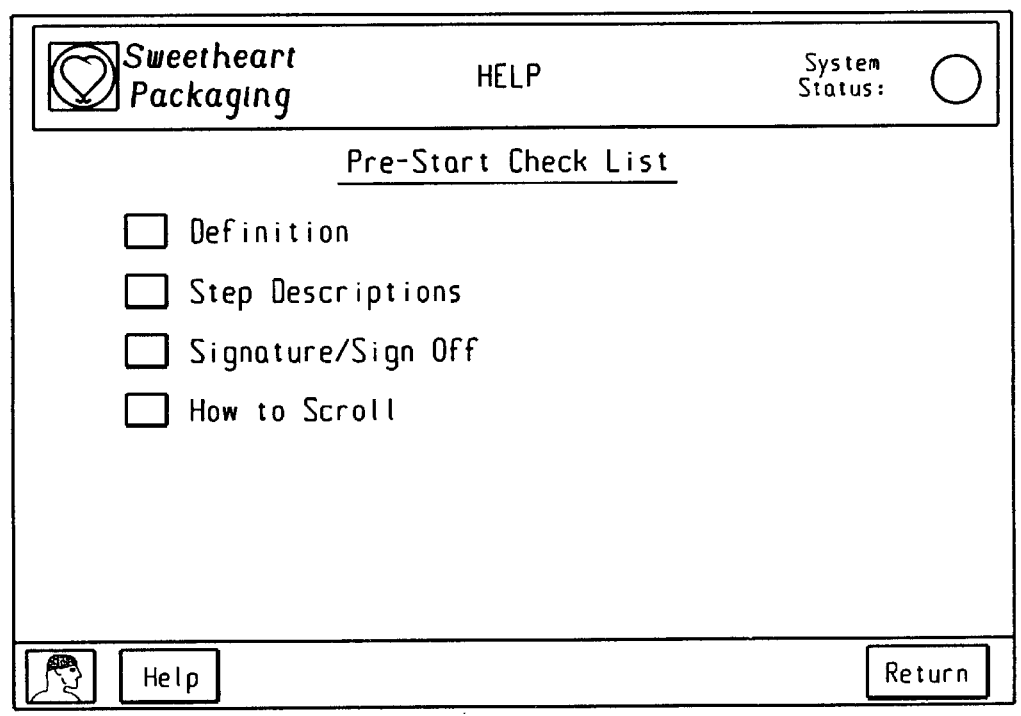
Screen 3.18  FIG. 39

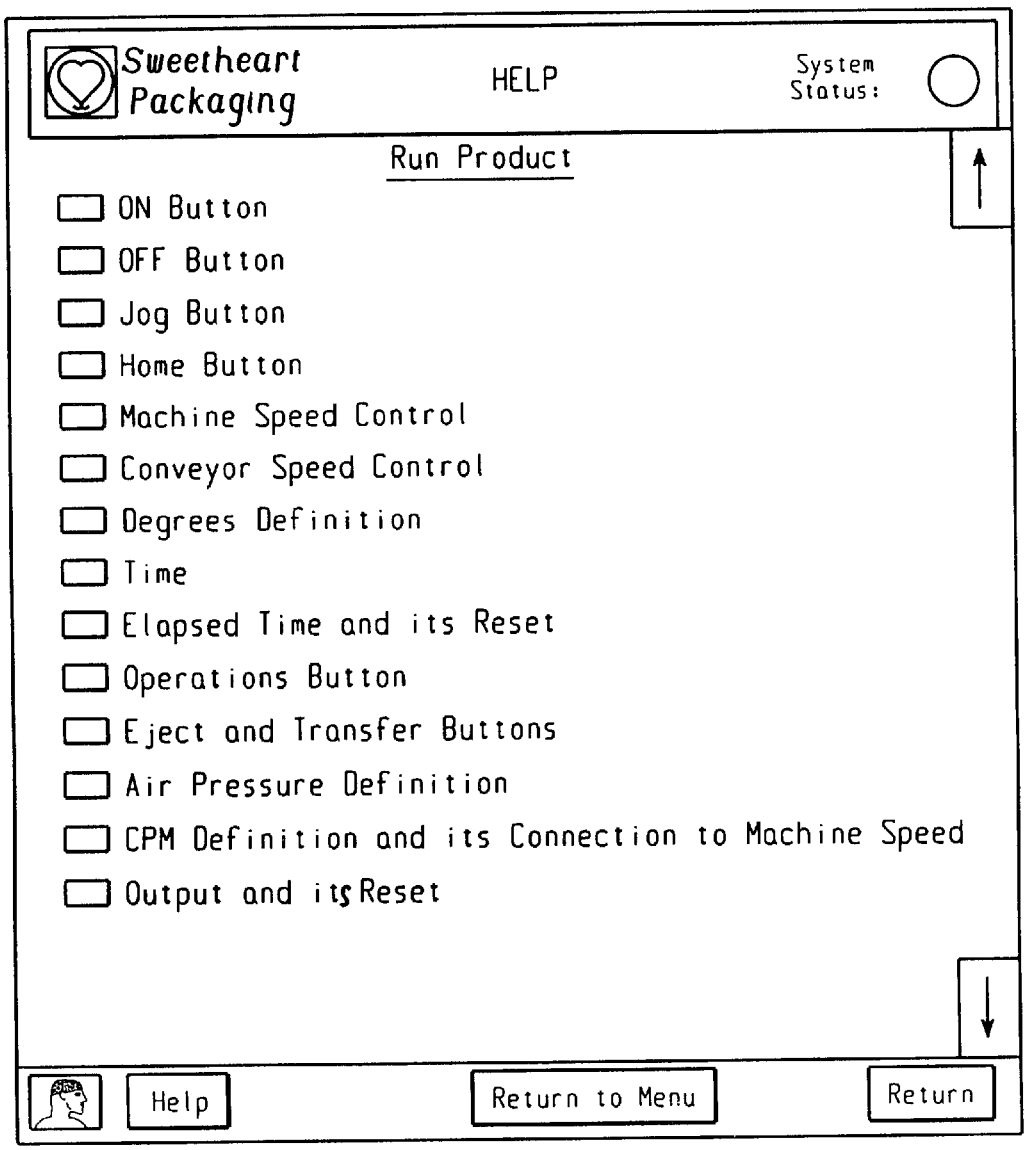
Screen 3.19  FIG. 40

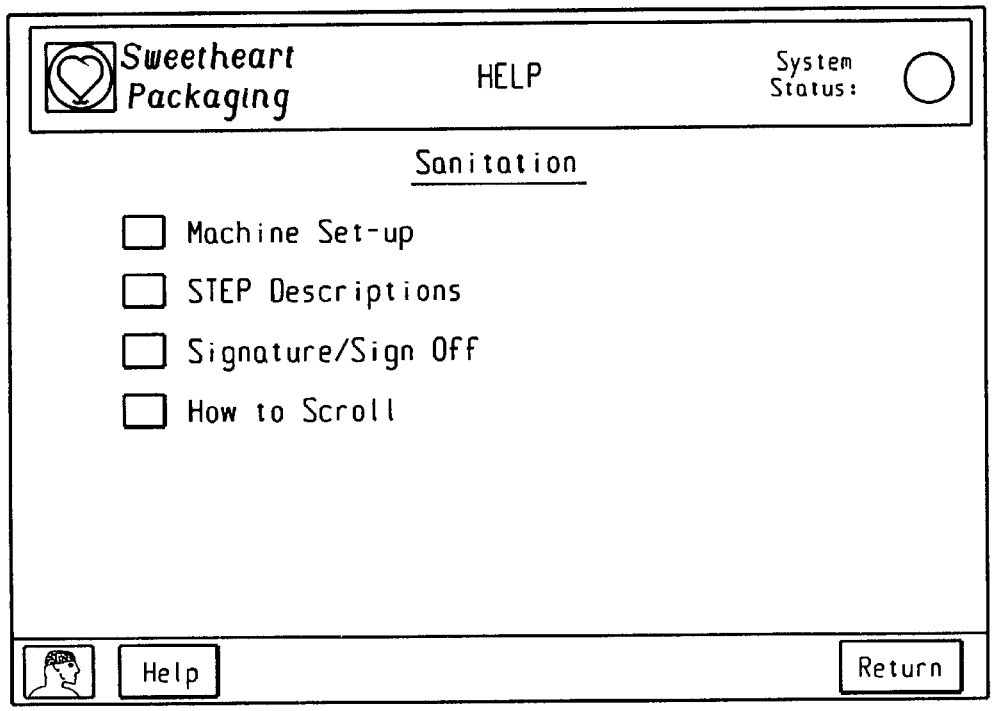
Screen 3.20   FIG. 41
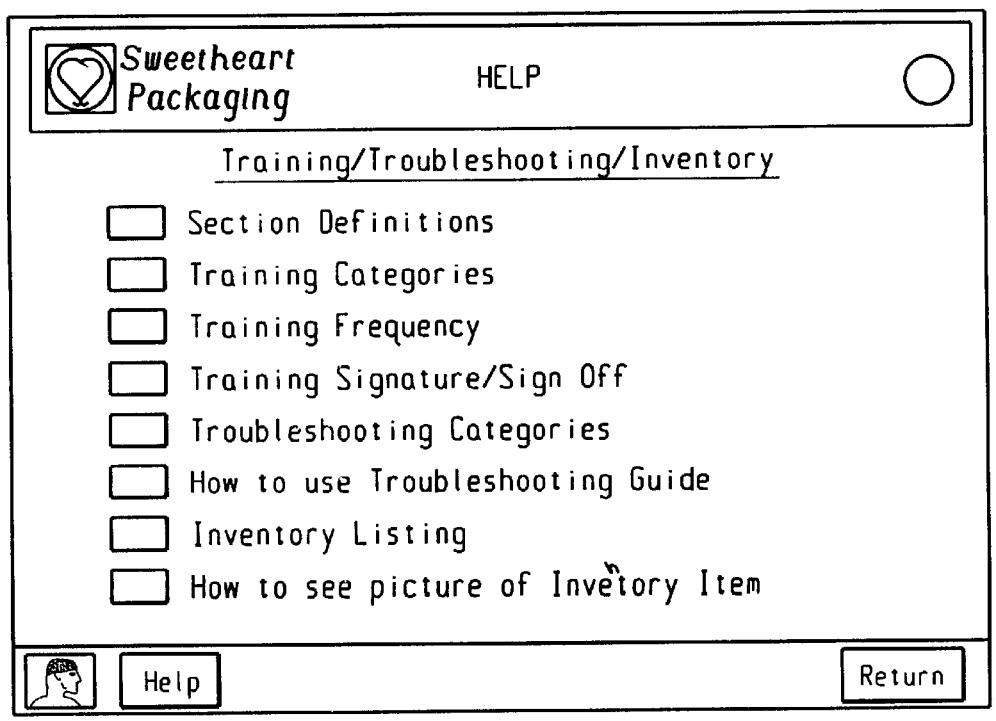
Screen 3.21   FIG. 42

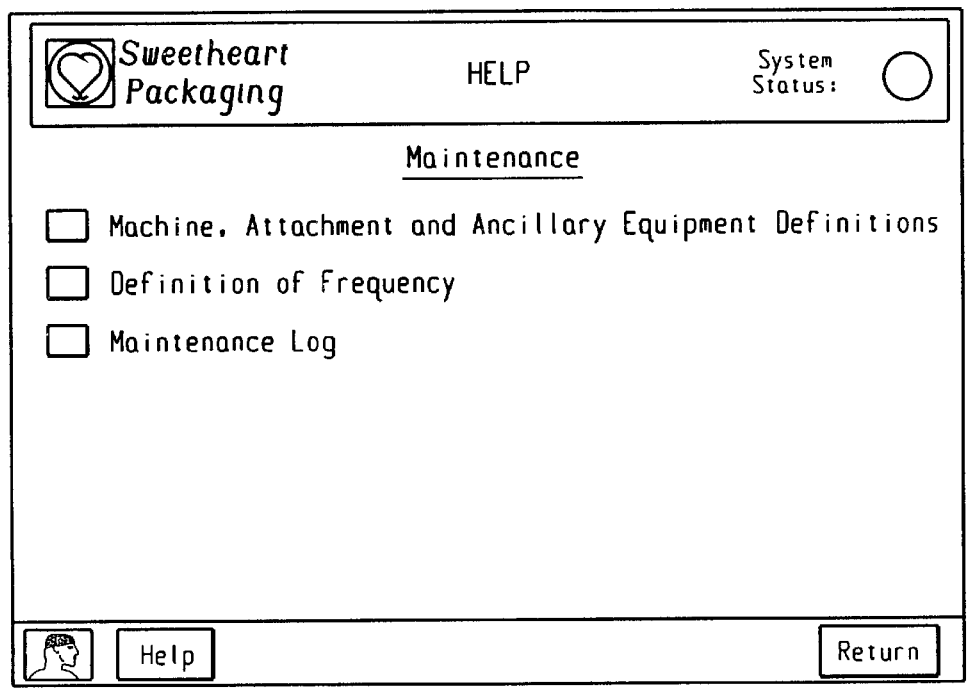
Screen 3.22  FIG. 43
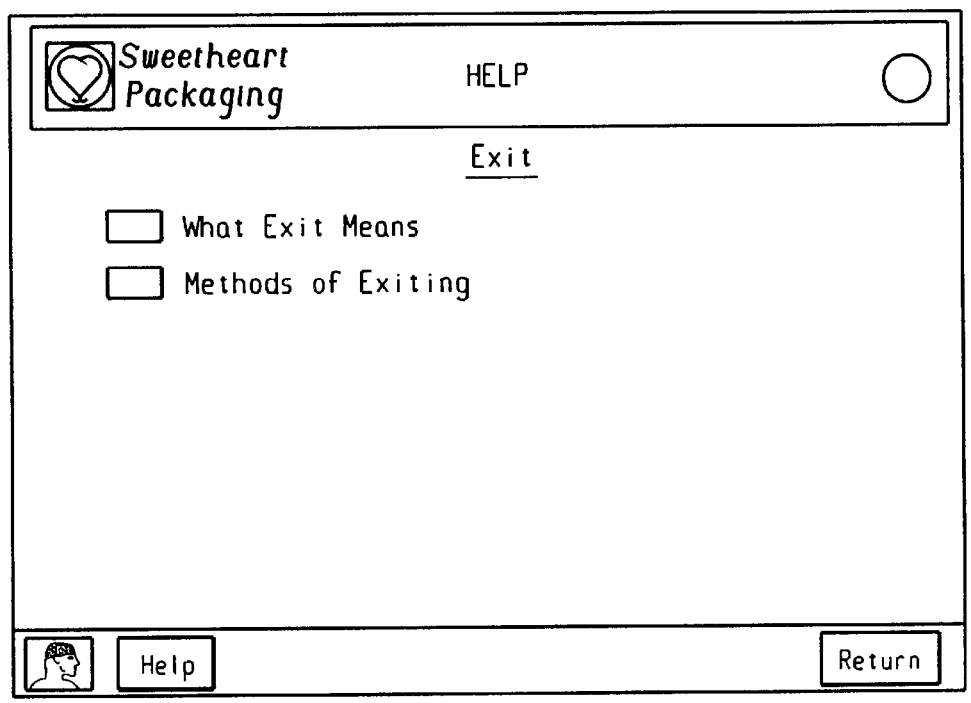
Screen 3.23  FIG. 44

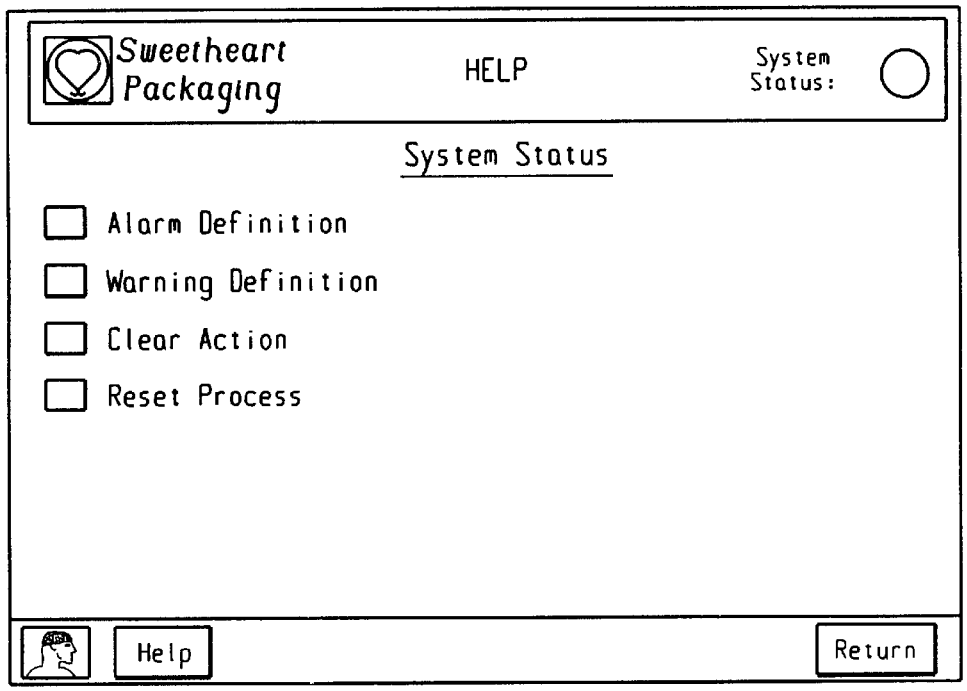
Screen 3.24 FIG. 45
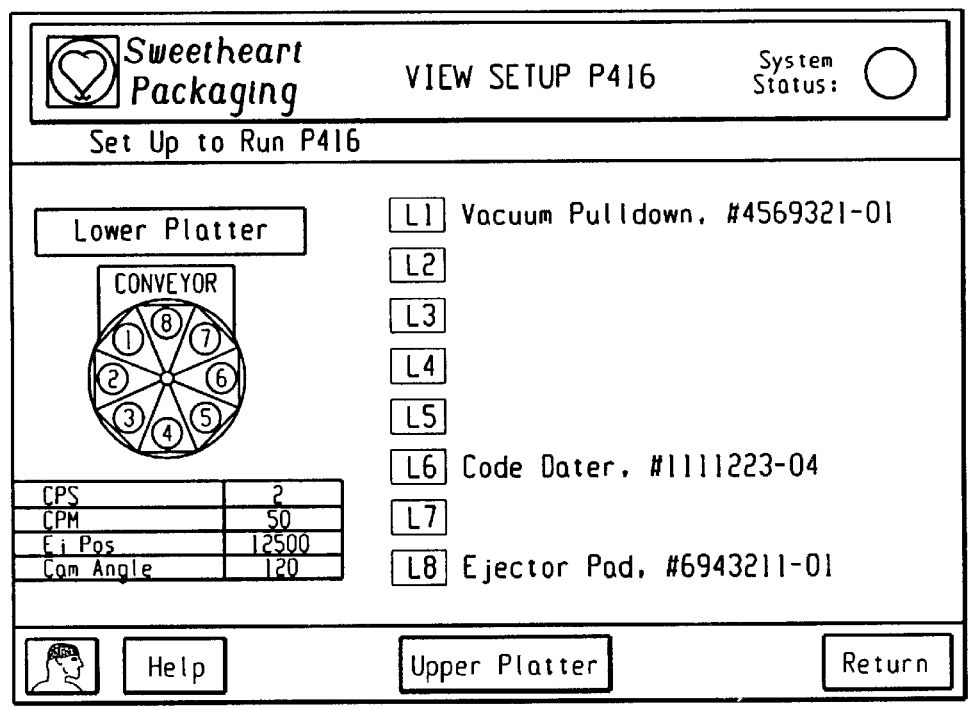
Screen 4.1 FIG. 46

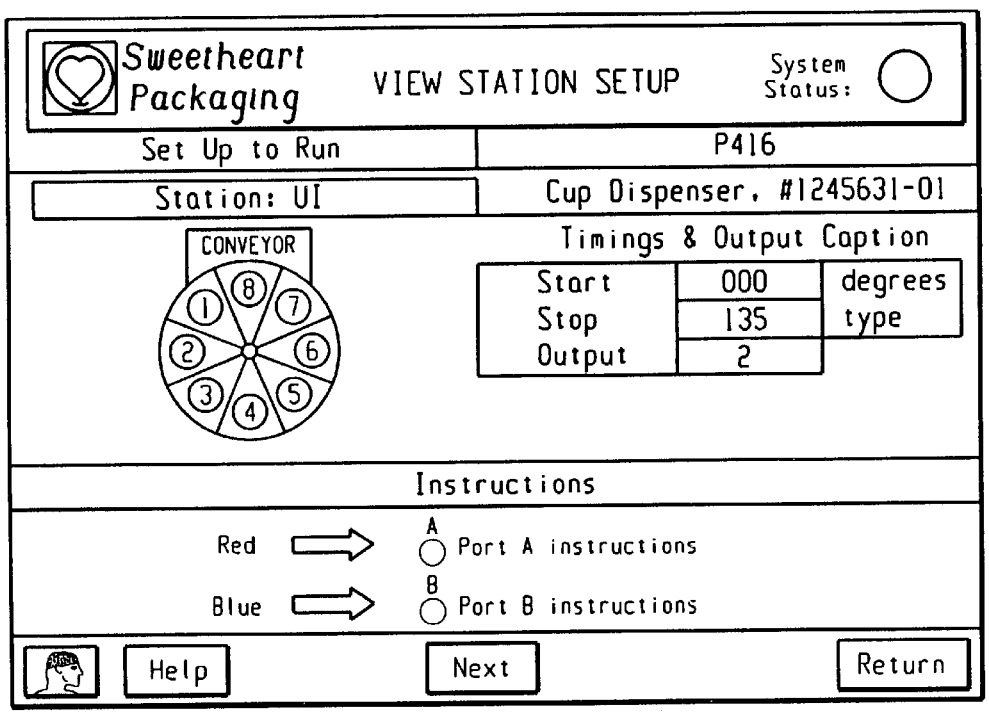
Screen 4.2  FIG. 47
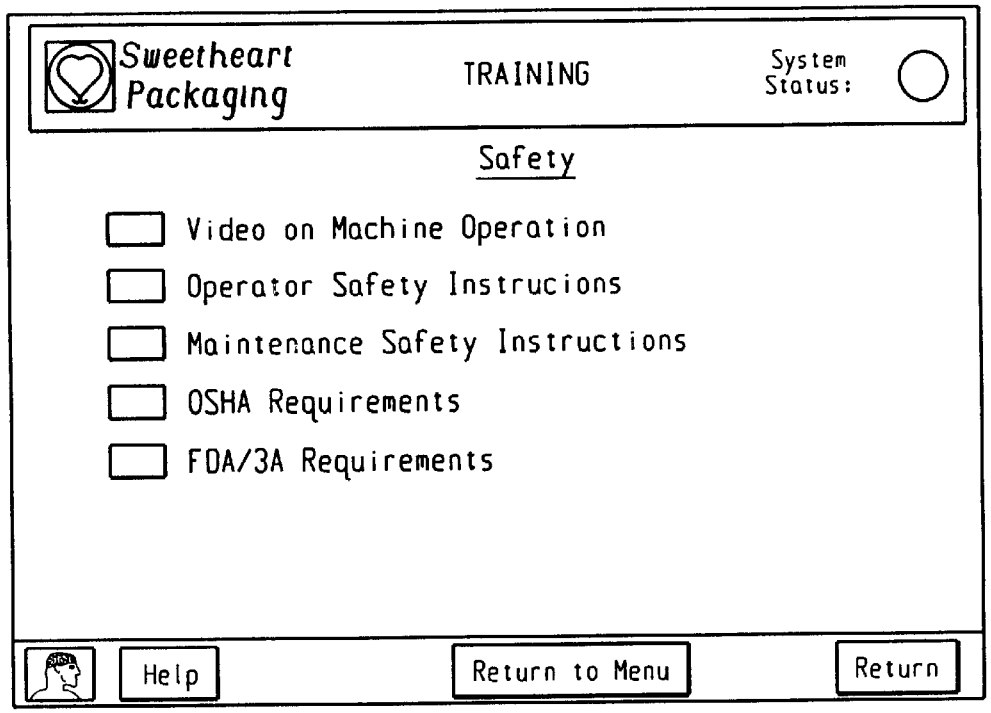
Screen 4.3  FIG. 48

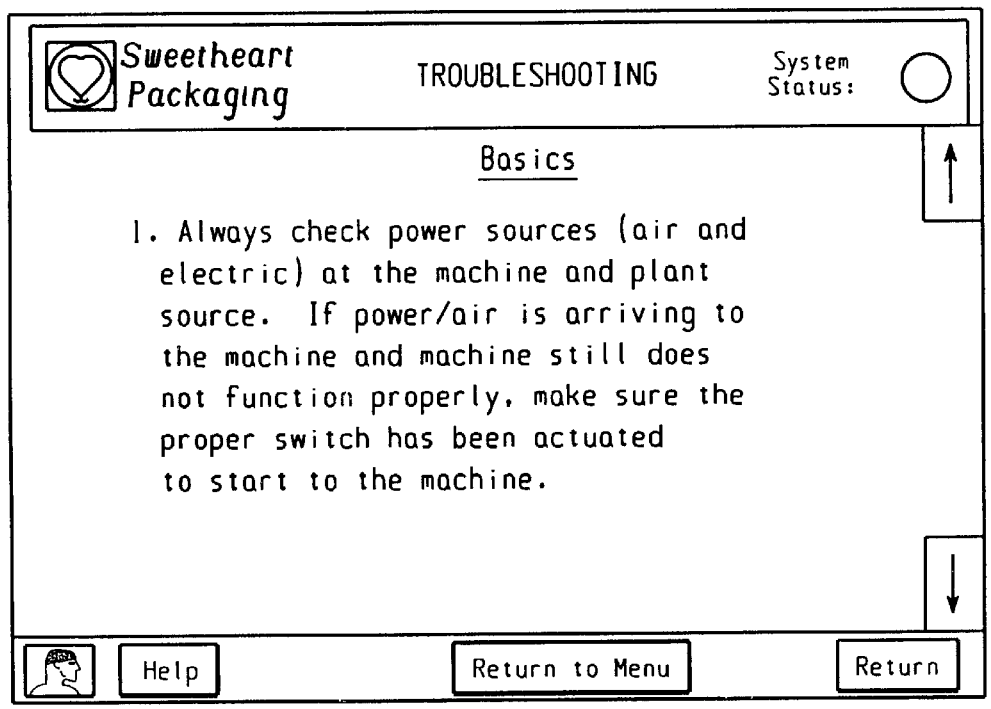
Screen 4.6  FIG. 49
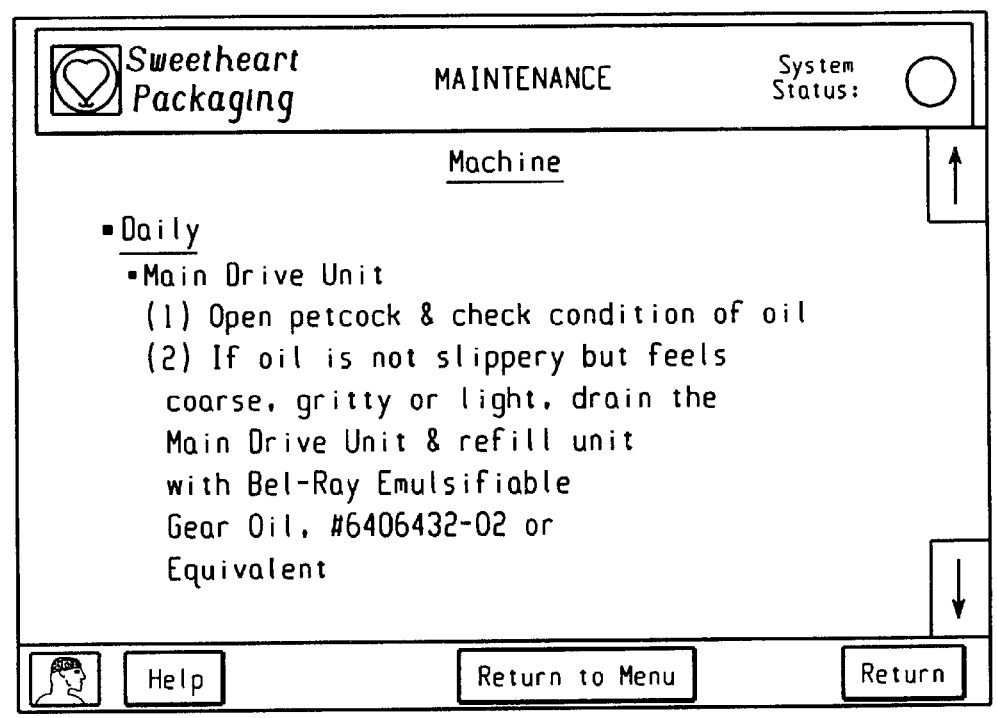
Screen 4.7  FIG. 50

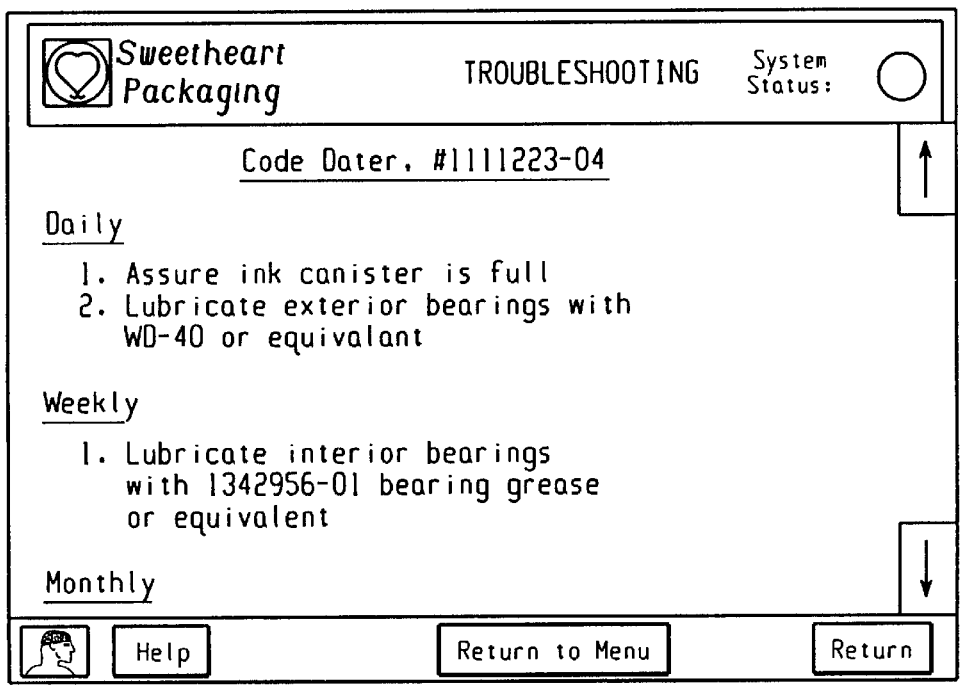
Screen 4.8  FIG. 51
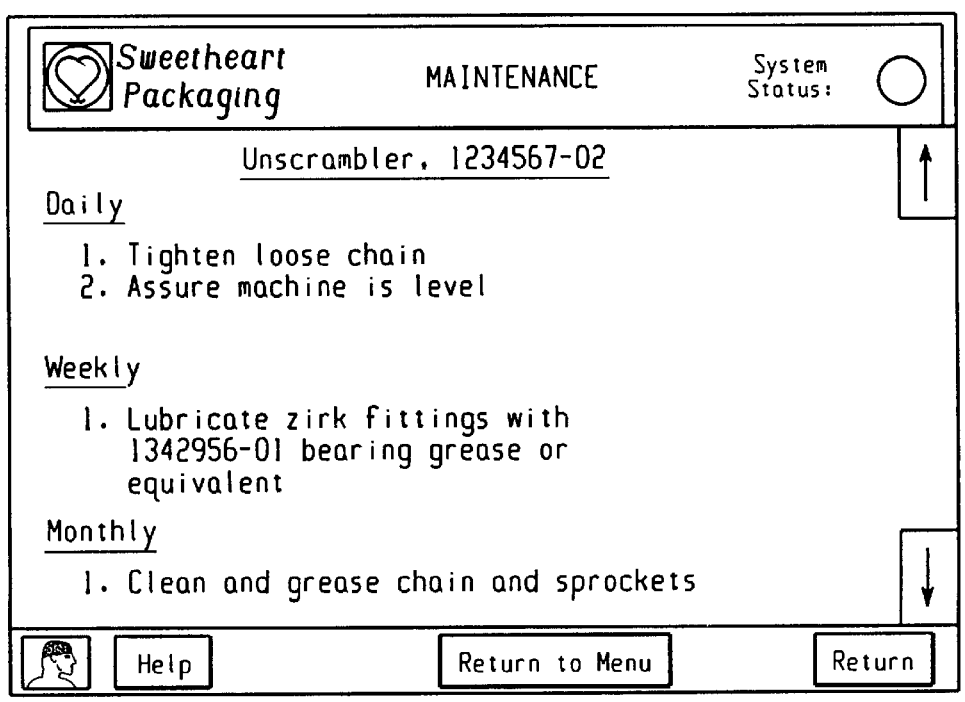
Screen 4.9  FIG. 52

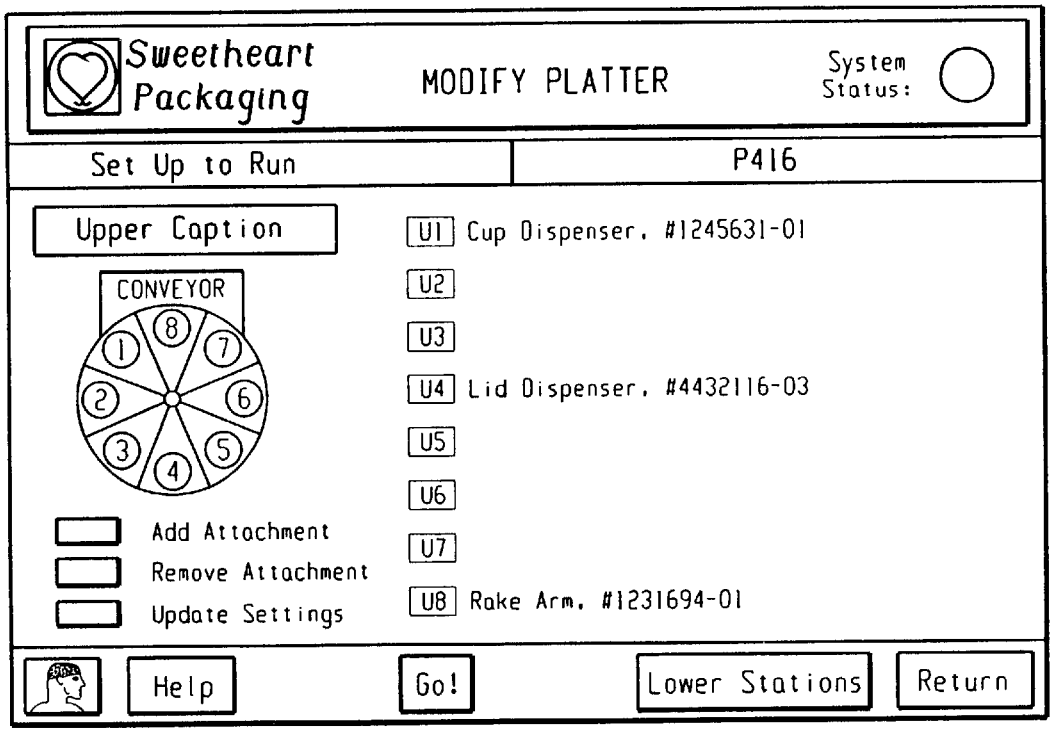
Screen 4.10   FIG. 53
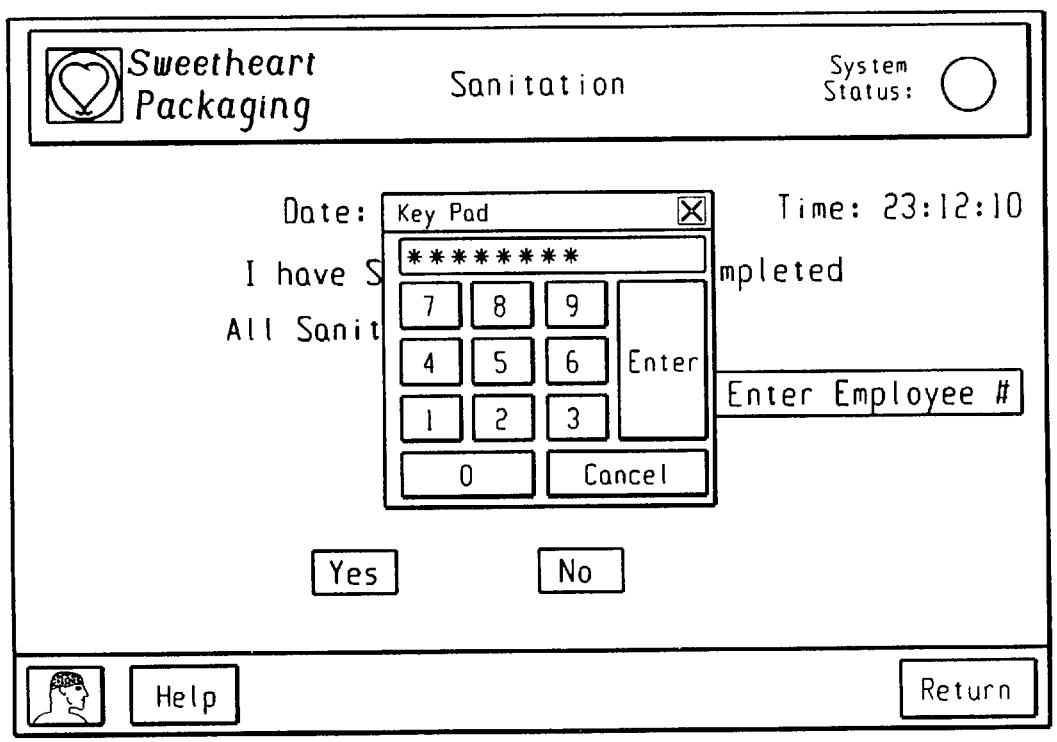
Screen 4.11   FIG. 54

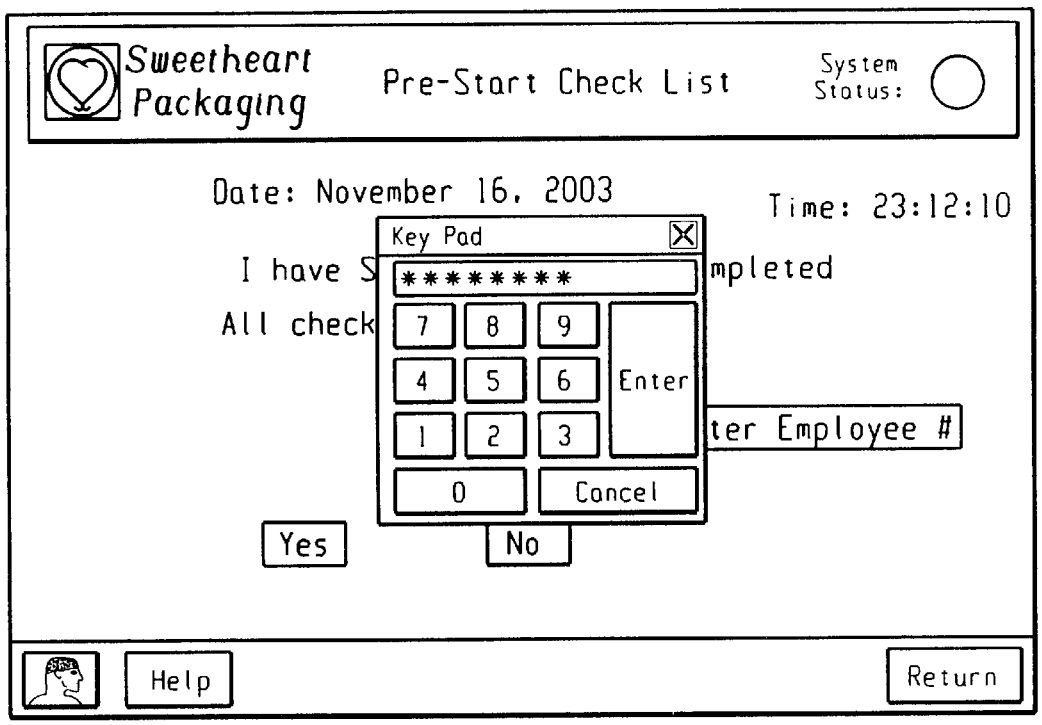
Screen 4.13  FIG. 56
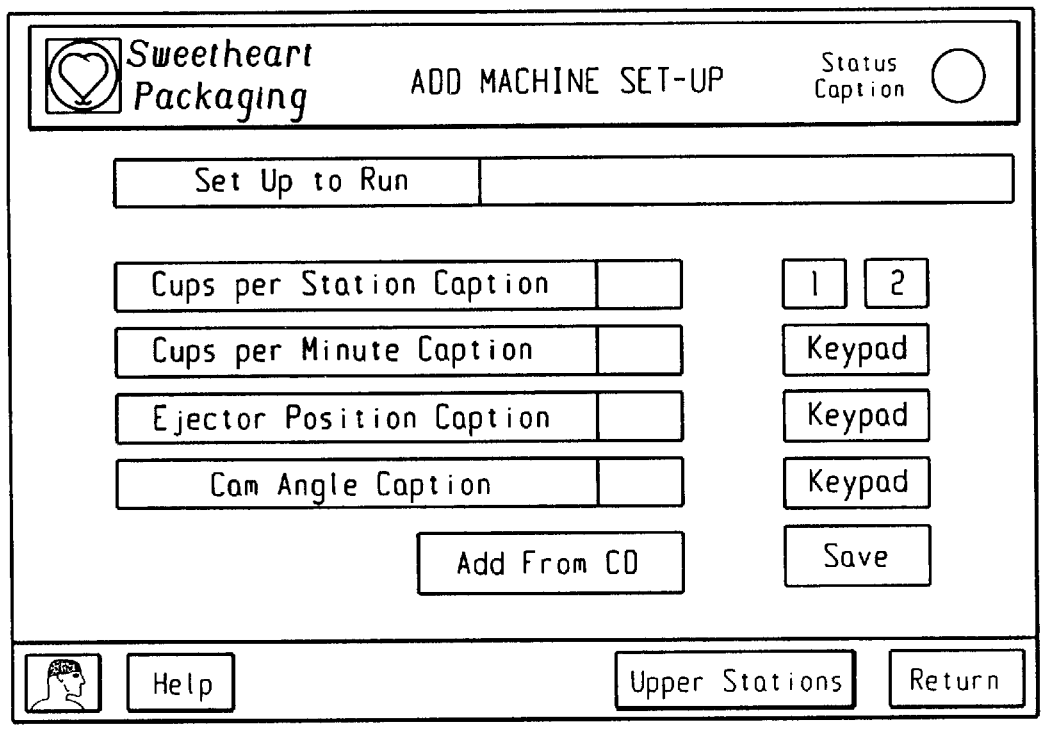
Screen 4.14  FIG. 57

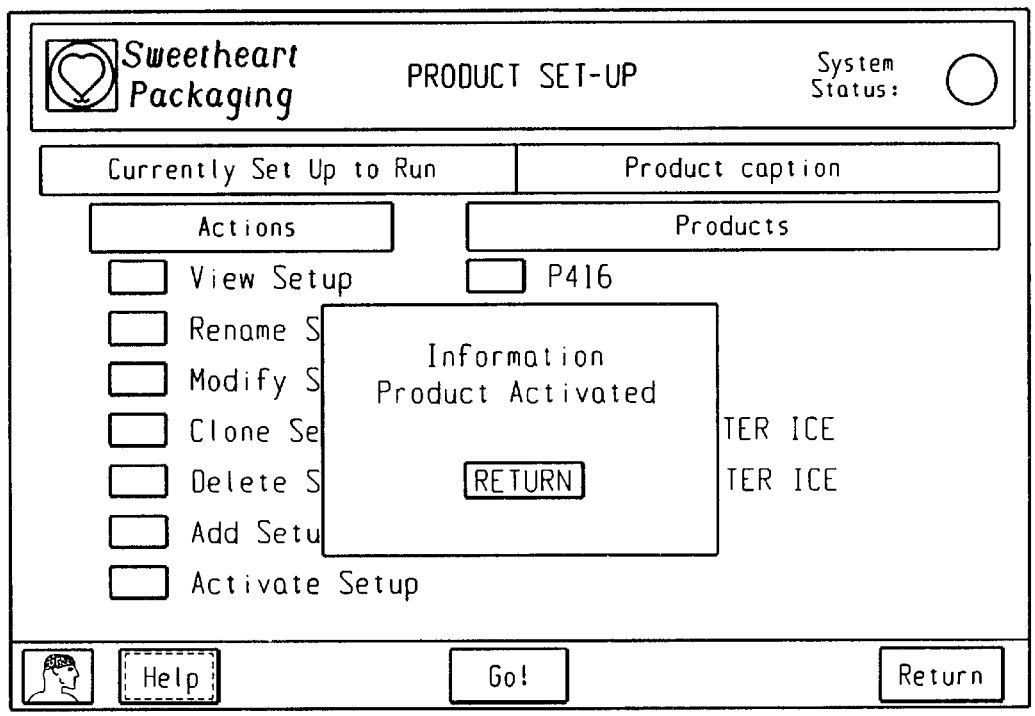
Screen 4.15  FIG. 58
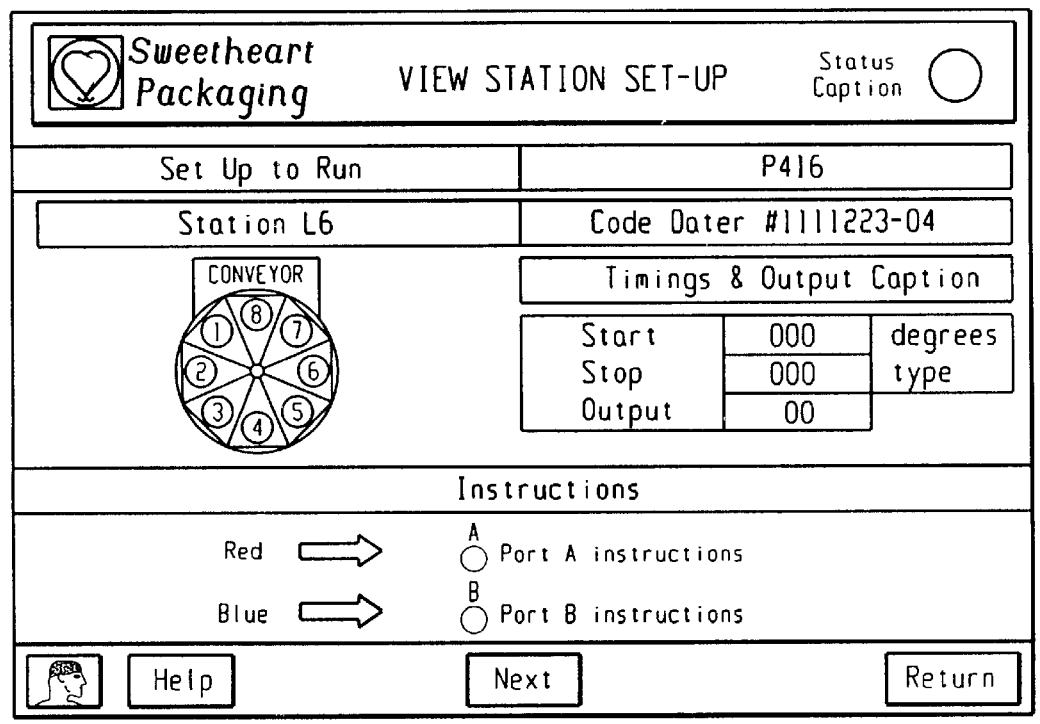
Screen 5.1  FIG. 59

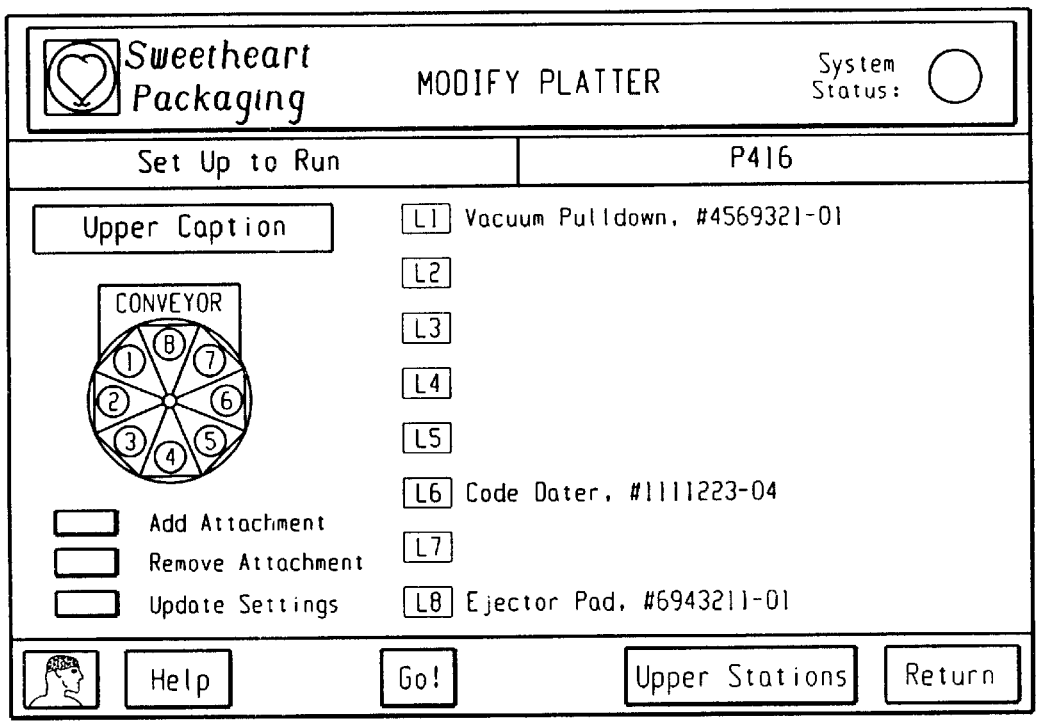
Screen 5.2 FIG. 60
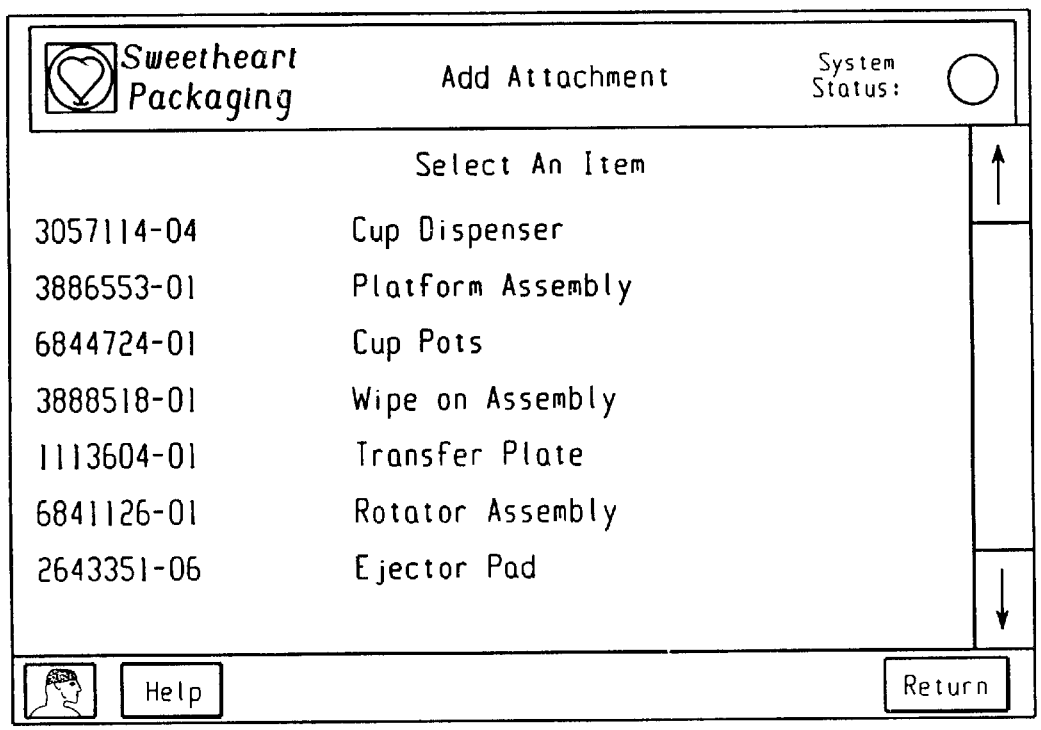
Screen 5.3 FIG. 61

Screen 5.4 — FIG. 62

Sweetheart Packaging — MODIFY STATION SET-UP — System Status:

| Set Up to Run | P416 |
|---|---|
| Station U1 | Cup Dispenser, #1245631-01 |

Timings & Output

| Start | 45 | degrees |
|---|---|---|
| Stop | 30 | degrees |
| Output | 12 | |

Stop Type
- [ ] degrees
- [ ] msec

Save

Help     Return

Screen 5.5 — FIG. 63

Sweetheart Packaging — TRAINING — System Status:

Operator Safety Instructions (1) Do not stick tools, hands, fingers or foreign objects into moving machine (2) Stop machine and disconnect power before working on or making adjustments to this equipment Help     Return

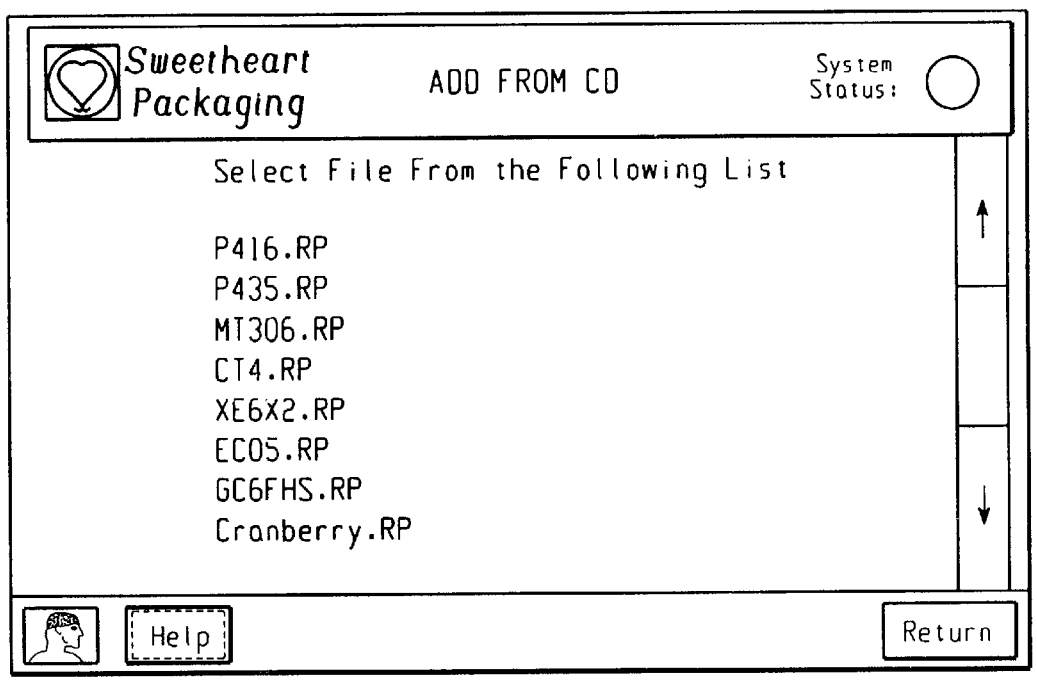
Screen 5.6    FIG. 64
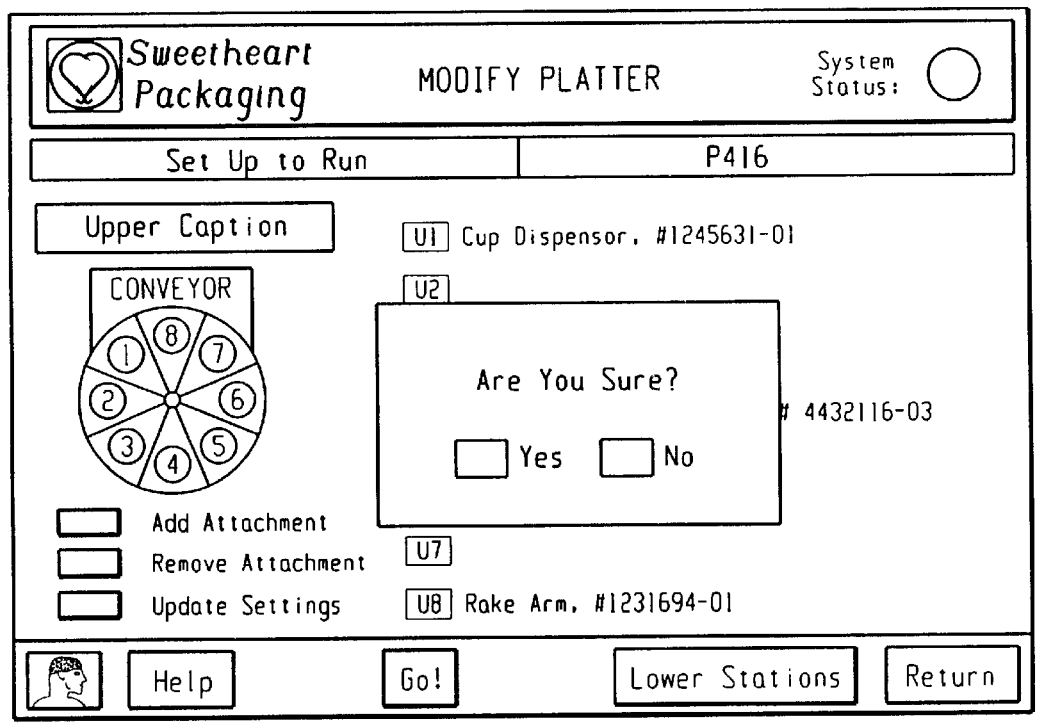
Screen 5.7    FIG. 65

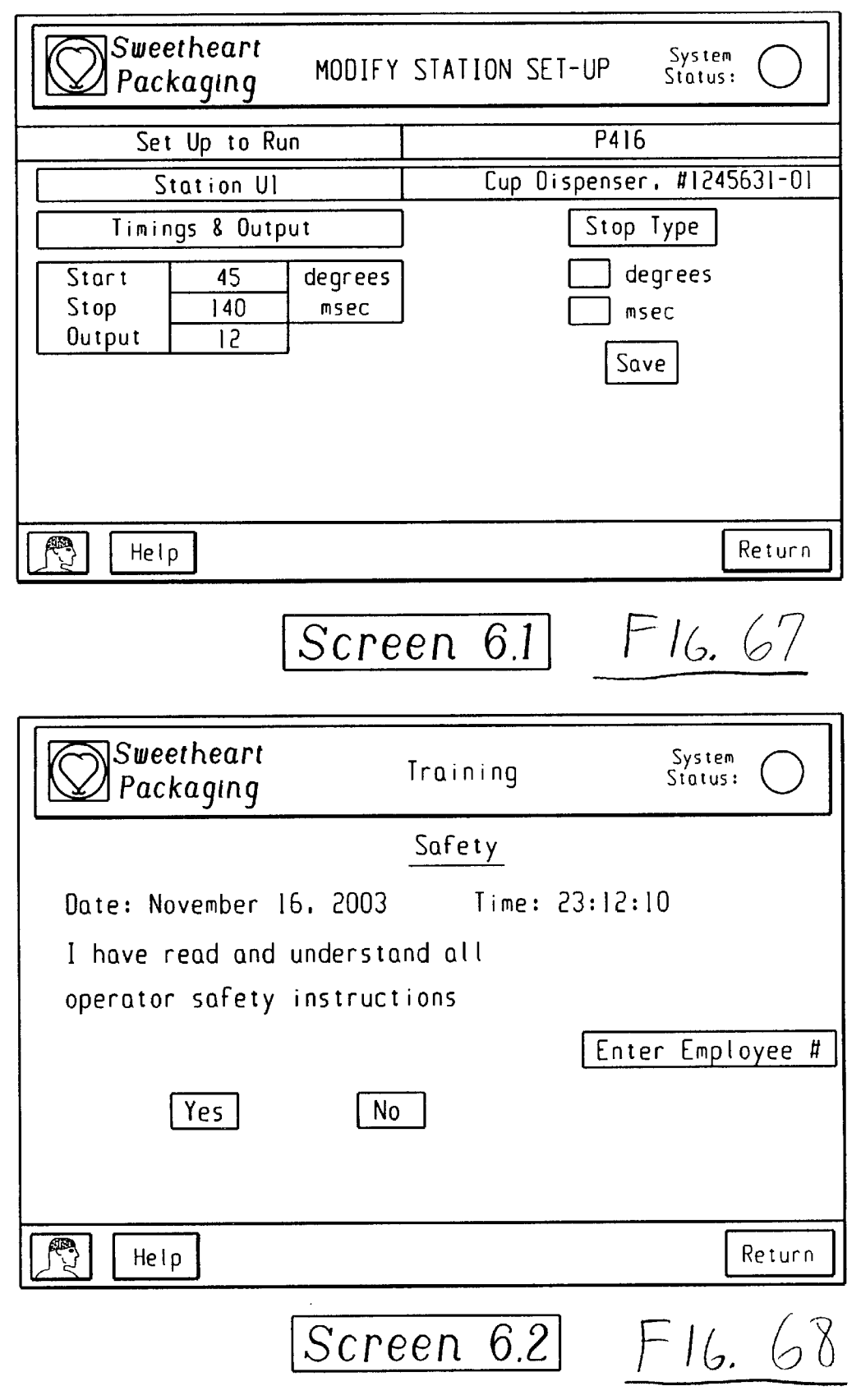

Screen 6.1    FIG. 67

Screen 6.2    FIG. 68

MACHINE AND SYSTEM FOR PACKAGING FOOD PRODUCTS

CROSS-REFERENCE TO RELATED APPLICATION

This application claims priority to U.S. provisional application Ser. No. 60/330,210 (entitled "Machine And System For Packaging Food Products" filed Oct. 17, 2001). By this reference, the full disclosure, including the drawings, of U.S. provisional application Ser. No. 60/330,210 is incorporated herein.

BACKGROUND

This invention relates to a machine and a system for packaging food products, and more particularly to a machine and a system for dispensing a liquid or semi-solid food product into a cup or other container.

It is well known to dispense liquid or semi-solid products into a cup or other container on a rotary indexing filling machine. Such machines are commonly used in dairies to fill cups or containers with yogurt, ice cream, and similar products. One type of rotary indexing filling machine commonly used for this purpose in dairy packaging plants is described in prior art patent U.S. Pat. No. 3,229,889, issued to John B. West; the disclosure of that patent is incorporated herein by reference in its entirety. The machine disclosed therein comprises a horizontal loading wheel having a plurality of apertures, the apertures able to support open containers to be filled. The loading wheel carries each open container through several stations at which different operations are performed. These operations can include filling the container with each of various ingredients, swirling or mixing the contents of the container, putting a film seal over the mouth of the container, applying a lid to the container, applying a bar code to the container, and so forth. The finished containers are lifted out of the loading wheel and transferred onto a conveyor system. The machine is actuated by various sets of drive gears, cams, and mechanical linkages.

Rotary indexing filling machines such as those described in the '889 West patent are typically dedicated to a specific range of products to be dispensed. When the product being dispensed is changed, the tool sets and processes must also be changed. Filling rates into the containers are determined, in part, by the control of the product during indexing. Changing or modifying this control is difficult, and often requires new indexing cams. Operators of such machines must be knowledgeable about the mechanics of the system and have significant training regarding the machine tools, set-up procedures and operating parameters required for each of the different food products to be packaged by the machine.

It is thus one object of the invention to provide a filling machine and a system for operating the machine that will allow increased flexibility by being capable of filling various products without changing tool sets or machine models.

It is another object of the invention to provide a filling machine and a system for operating the machine that will provide enhanced ease of set up and operation such that machine operators will not be required to have extensive training and mechanical knowledge.

It is still another object of the invention to provide a filling machine and a system for operating the machine that will allow precise control of the product during indexing of the machine by adjusting the filler dynamics to the viscosity of the product being dispensed, thus avoiding spills.

It is yet another object of the invention to provide a filling machine and a system for operating the machine in which most of the machine drive components are enclosed in a substantially moisture proof housing, thus prolonging the life of the components, reducing maintenance costs, and allowing faster cleaning of the machine.

SUMMARY

In accordance with the invention, a rotary indexing filling machine is provided which is capable of performing the same functions as prior art filling machines, but in which several of the main mechanically driven actuators are replaced by pneumatic actuation means and a servo-motor. The elimination of the mechanically driven actuators greatly increases the flexibility of the machine, because the machine can be changed over from one product line to another without physically removing and replacing mechanical gears and indexing cams. Because the mechanical drive units have been eliminated, the machine can be run by operators who do not have extensive knowledge of mechanical drive systems or extensive training. Advantageously, the absence of the gear mechanisms of the prior art allows certain pneumatic and electronic components to be housed within a moisture proof housing. This facilitates easier washing of the equipment, such as when it is being changed over from one product to another.

Significantly, the use of a servo-motor and solenoid-activated pneumatics allows the machine to be used as part of an operating system that can be controlled, operated, and monitored by computer. Parameters for operating the machine can be entered into the computer, which can control the speed and functions of the machine. This obviates the resetting of tooling, cams, and gears such as was required to accomplish similar changes in prior art machines. The use of computer controlled components also allows the machine to serve as part of an entire computer controlled system, in which one such machine or many are controlled, operated, and monitored by computer. Such a system can provide for the efficient transfer of production data by either wire or radio frequency to either a computer or personal digital assistant. Further, each machine can function as its own internet website. A person located away from the food packaging plant can log onto the website, read the production data, see a video image of the machine, and call instructions into the plant to make adjustments and correct problems.

BRIEF DESCRIPTION OF THE FIGURES

FIG. 5 is a block diagram showing the architecture of the system for operating one or more machines such as illustrated in FIGS. 1–4.

FIG. 10 is a flowchart depicting steps associated with emergency stop handling.

FIGS. 12–68 are screen displays that may be used in the system.

DETAILED DESCRIPTION

Figure 1:
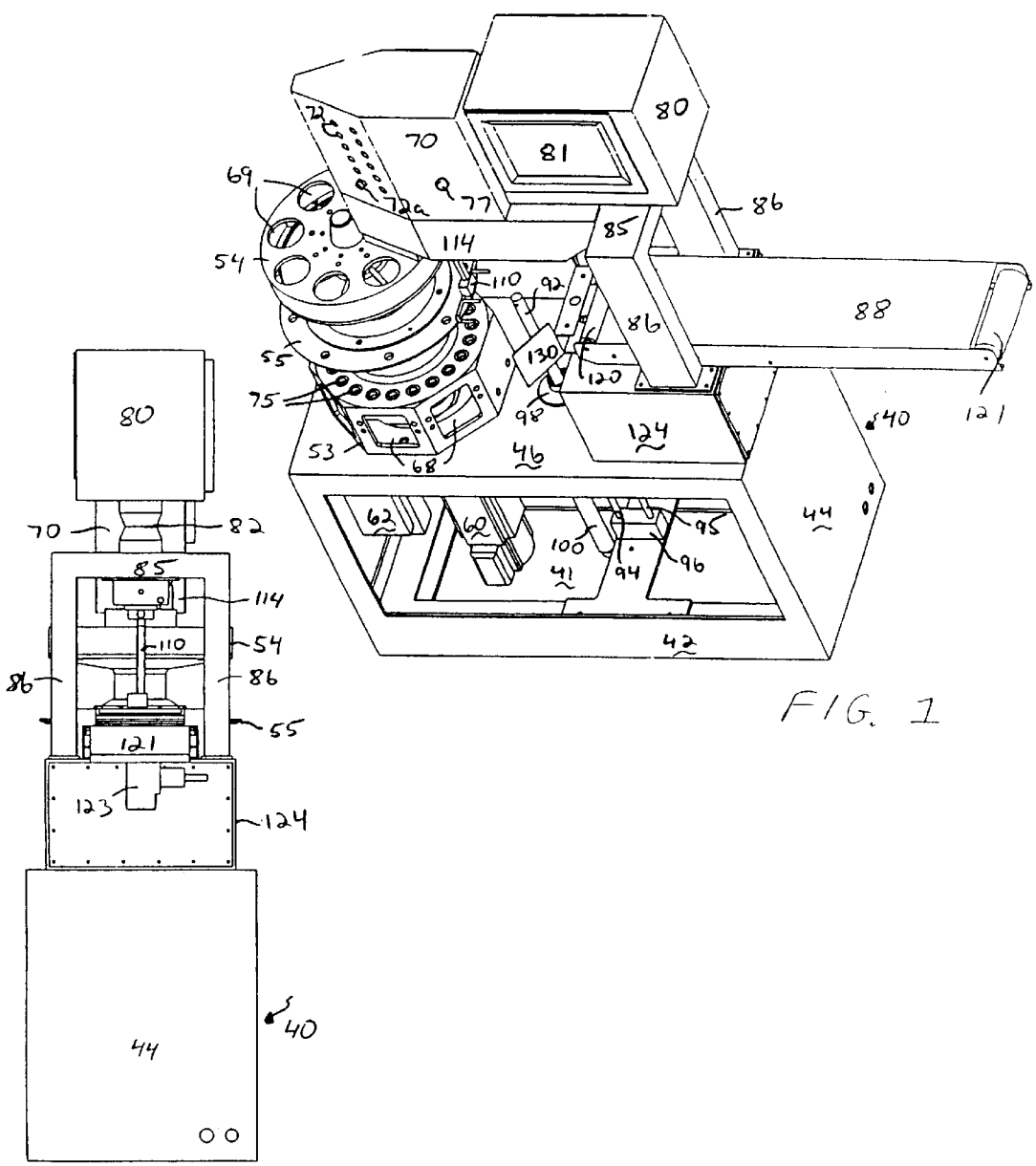
FIG. 1 is a perspective view of an embodiment of a rotary indexing filling machine in accordance with the instant invention.
Figure 3:
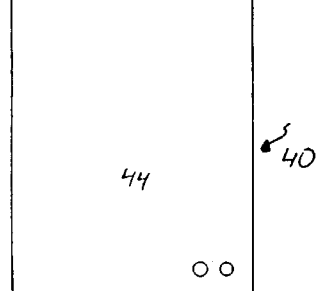
FIG. 3 is another side elevation view of the machine as seen from the right side of FIG. 2.
Figure 4:
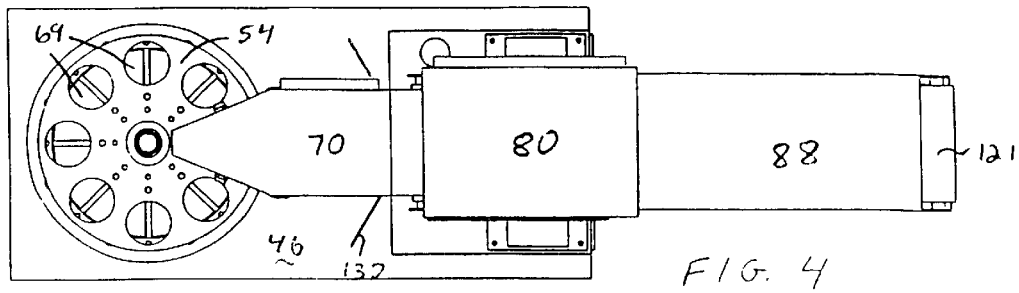
FIG. 4 is a top plan view of the machine of FIG. 2.
Figure 2:
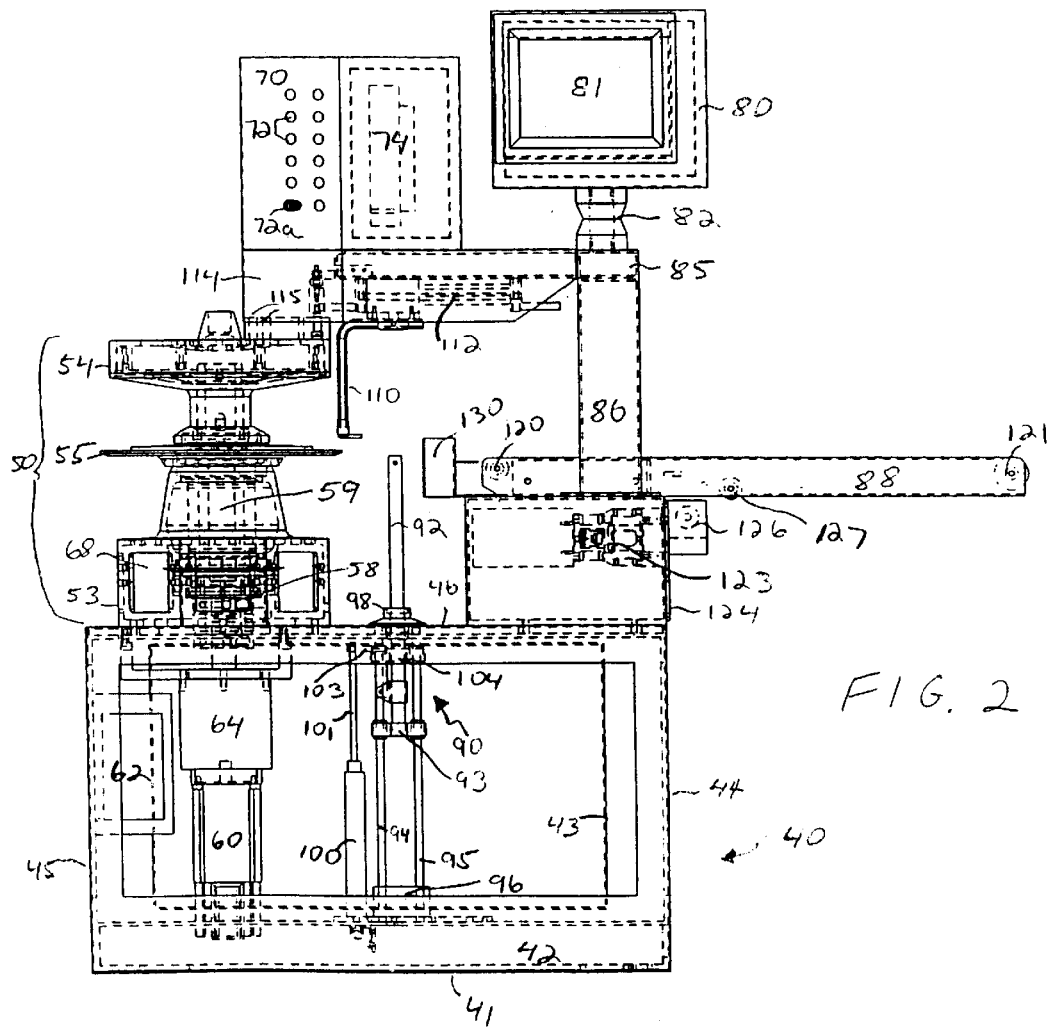
FIG. 2 is a side elevation view of the machine of FIG. 1.

Referring to the drawings, the embodiment of the invention illustrated therein comprises a base support 40 having bottom panel 41, side panels 42, 43, end panels 44, 45, and a top panel 46, all of which are welded together to form a moisture-proof enclosure. Preferably, the panels of base support 40 are all stainless steel. Not shown are access doors with moisture-proof seals, provided in panel 42, panel 43 or both. Although base support 40 as illustrated in FIGS. 1 and 2 appears to have openings in side panels 42 and 43, those apparent openings are only to allow the reader hereof to observe the structures within the enclosed cavity defined by the interior of base support 40. In reality, the side panels do not have such openings and base support 40 provides an enclosed, preferably waterproof container. Base support 40 can be mounted on casters or wheels, not shown.

Mounted on the front end of the base support 40 is the turret unit 50 comprising a lower mounting means 53, an upper mounting means 54, and a horizontal hub 55 disposed between the mounting means 53 and 54. Horizontal hub 55 is adapted to support thereon each of several loading wheels, not shown. Each load wheel has spaces to hold containers of a certain size to be filled as disclosed in U.S. Pat. No. 3,225,889. In the prior art machine of the aforementioned '889 patent, the structures 53 and 54 designated gear housings; in the instant invention, these gears have been removed, and these structures serve as mounting means for various operational units, as described further below.

Mounting means 53 and mounting means 54 are each stationary. A shaft 59 extends from gear reducer 64 upwardly through top panel 46, through lower mounting means 53, and through horizontal hub 55, which is operatively connected to shaft 59. One or more annular seals generally indicated at 58 maintain a moisture-proof seal with top panel 46. Servomotor 60 is controlled by controller 62. Servomotor 60 operates through gear reducer 64 to cause shaft 59 to rotate, thereby causing controlled rotation of horizontal hub 55. When horizontal hub 55 is supporting a loading wheel carrying containers to be filled, the controlled rotation allows the containers to be moved from one operational unit to the next, disposed about the circumference of the turret 50.

In the illustrated preferred embodiment, gear reducer 64 is a 25:1 reducer, i.e., every 25 revolutions of servo motor 60 is reduced to one revolution of shaft 59.

Lower mounting means 53 is provided with a number of circumferential access openings 68. Optionally, each access opening can be provided with a cover secured such as by lug bolts, not shown. Operational units can be mounted on any of the access openings 68. Similarly, upper mounting means 54 can be provided with openings 69 to receive other operational units. Operational units attached to upper mounting means 54 will include units that function at or above the container, such as filling units for a variety of different ingredients, film cover applicators, lid applicators, and the like. Operational units attached to lower mounting means 53 will include units that function at or near the bottom of the container, such as a vacuum pull to hold the container in place in the loading wheel, date coders, bar coders, and units to lift and rotate the container to mix or swirl certain ingredients in the container.

As described in U.S. Pat. No. 3,225,889, in prior art machines the various operational units were controlled mechanically with gears and cams, and in particular all the attachments were coupled to a main gear system that operated the entire machine in synchronization. The machine of the instant invention eliminates the gears and cams of the prior art, and instead uses computer-controlled pneumatic operation. Housing 70 provides a plurality of pneumatic ports 72; a quick disconnect such as shown at 72*a* can in fact be used on all ports 72. Pneumatic ports 72 can each be selectively connected to the various operational units mounted to upper mounting means 54 by pneumatic lines (not shown) to provide pneumatic control for each such operational unit. Mounted within housing 70 are a plurality of computer controlled solenoids 74 that open and close pneumatic ports 72 on demand. Each solenoid is connected to a pair of circuits, each circuit in the pair controlling one pneumatic port, with at least one pair of ports connected to each operational unit. When the computer (discussed below) instructs the solenoid to operate one circuit in the pair, pneumatic pressure is provided to the corresponding port, and the other port in the pair is exhausted to the atmosphere. Similarly, when the computer instructs the solenoid to operate the second circuit in the pair, pneumatic pressure is provided to the second pneumatic port, and the first port in the pair is exhausted to the atmosphere. In this manner, pneumatic pressure is either delivered to, or diverted from, the operational unit operated by that pair of ports, to cause that operational unit to perform its function or cease.

Lower mounting means 53 is provided with a plurality of pneumatic ports 75 operatively connected to a different set of solenoids, not shown. These pneumatic ports and solenoids operate those operational units mounted on lower mounting means 53. Such an arrangement advantageously avoids crossed or tangled pneumatic lines between the upper and lower housing means.

A computer 80 is provided with a human-system interface such as touch-screen 81, although other interface means such as keyboards, keypads and the like can be used. The computer 80 is mounted by means of rotating coupling 82 that allows for 360° rotation of the touch screen so that it can be arranged for access by the machine operator from any angle. Rotating coupling 82 is mounted on frame 85 which is the shape of an inverted "U". The downwardly extending legs 86 of frame 85 straddle a conveyer 88 that is used to remove containers from the loading wheel on hub 55.

The instant invention comprises an elevator unit and a transfer unit similar to those described in the aforementioned U.S. Pat. No. 3,225,889, but operated pneumatically (or electrically) rather than mechanically. Specifically, at the periphery of the loading wheel adjacent the conveyor unit 88 is disposed an elevator unit 90. The purpose of the elevator unit 90 is to raise the filled containers from the apertures of the loading wheel to place them in a position to be transferred to the conveyor unit 88 by the transfer unit.

The elevator unit 90 comprises a vertical reciprocating shaft 92 so disposed relative to hub 55 as to engage the bottom of a filled container and elevate it to a position above the hub 55 when the shaft 92 is moved upwardly. The top of shaft 92 can be provided with a replaceable pad, not shown, sized and dimensioned to engage the bottom of a filled container. The shaft 92 is secured to first cross-head 93 that is slidably mounted on stationary guide rods 94, 95 between apertures in top panel 46 and apertures in a block member 96 secured to t-panel 97 mounted to the interior of base support 40. A collar 98 is disposed in the top panel 46 to receive and seal the shaft 92 as it reciprocates.

Double-acting pneumatic cylinder 100 has a reciprocating rod 101 joined by connector 103 to second cross-head 104 operatively connected to shaft 92. Double acting cylinder 100 can be alternately pressurized on its lower and upper ends to raise and lower, respectively, reciprocating shaft 92.

The lower limit of travel of the shaft is made adjustable while the upper limit of its travel remains constant, thereby permitting the use of this pneumatic elevator mechanism with containers of different vertical dimension. The system electronics, not shown, will sense the position of cylinder rod 101 and the computer program will cause air cylinder 100 to be pressurized as needed to adjust the height of shaft 92 as needed. Advantageously, the various retracted positions of shaft 92 are not defined by mechanical stops.

The transfer unit moves the containers from the uppermost position of vertically extending shaft 92 to the conveyor unit. The transfer unit comprises a rake arm 110 operated by a pneumatic linear slide unit 112 (or an electric linear slide) mounted in horizontal housing section 114. Linear slide unit 112 causes the rake arm 110 to engage a container and push the container from upwardly extending shaft 92 through guide means 130 onto conveyor 88. Guide means 130 can comprise two oblique panels and a bridge between shaft 92 and conveyor 88.

Upper mounting means 54 is secured to horizontal housing section 114 by bolts 115 to maintain mounting 54 in a stationary position.

The conveyor unit comprises an endless belt, not shown, preferably of washable plastic interlock, and mounted on rollers 120, 121 to cover conveyor 88. Conveyor motor 123 is mounted within motor housing 124. Conveyor motor 123 drives conveyor gear box 126 which drives spur gear 127 which drives the conveyor 88. The speed of conveyor motor 123, and therefore the speed of the conveyor unit, is controlled by computer 80.

An emergency stop button 77 is located on either side of housing 70. When this button is pressed, all pneumatic pressure to the operational units, the elevator and the rake arm is disconnected. At the same time, the motors rapidly decelerate hub 55 to zero velocity; the power then disconnects. This allows all parts of the machine to be moved by hand, so that any obstruction can be removed or any potentially unsafe condition can be rectified.

FIG. 5 illustrates the architecture of the system designed for operating one or more of the machines as disclosed in FIGS. 1–4. A programmable logic controller ("PLC") 150, enclosed within base support 40, is controlled by computer 80. The PLC 150 transmits instructions to controller 62, which controls servomotor 60. The PLC receives input from controller 62, computer 80, electronic sensors on the operating units (not shown), electronics coupled to elevator unit 90, from pneumatic linear slide unit 112, and from electronic sensors 152 mounted on each of lower mounting means 53, housing 70, and housing 124.

In accordance with the software program in computer 80, and in response to input received, the PLC 150 instructs each of controller 62, elevator unit 90, pneumatic linear slide unit 112, drive motor 123, all at pre-determined times, speed, ramp up speed, ramp down speed, dwell time and operating duration. In this manner, the operation of the rotating hub 55, the elevator shaft 92, the rake arm 110 and the conveyor 88, respectively, are each automatically optimized for each product line.

A function of the computer software is to provide operating instructions for each product. The software also compiles operational data, such as the number of containers filled per minute, the number of containers filled since the parameters were last reset, how long the machine has been running, and so on. The touch screen features a start button that initiates operation, a stop button that causes each operating unit to complete its current operation and stop, and a homing button that causes the machine to cycle until it finds its home position as determined by feedback information from servomotor 60. An additional homing feature solves the problem encountered with prior systems using servomotors wherein tolerance errors become additive as operation progresses; this additional homing feature effectively eliminates such additive tolerance errors over the course of operation of the machine.

Another function of the software is to provide the operator with a pre-start checklist designed uniquely for each product to be run on the machine. Such a checklist can include making sure that the correct operational units have been mounted on the upper and lower mounting means, and that the correct size loading wheel has been mounted on horizontal hub 55. The checklist can be configured to the needs of each dairy.

Still another function of the software is product set-up. The user can input what products the system is to run, and the system will respond by giving instructions on the touch-screen as to how to set up the machine for that particular product, such as what attachments are required. The computer then automatically sets the machines operating parameters, such as timing and retracted position of shaft 92. Formerly, such parameters had to be set by hand. The computer contains a file of operational information, which is made available to the user. This file can be copied and modified for different products unique to that particular user. The computer also updates the user's database file.

Still other functions that can be provided by the computer include control of a sanitation cycle; computerized tutorials for users; inventory; trouble-shooting guides; and a maintenance schedule. The computer can also provide error messages during machine operation. The output at the touch screen can be made available in more than one language, to facilitate use by different operators.

The computer 80 provides production data to data transmission hub 160. From hub 160, the data can be transmitted to RF access point 162 from which it can be received by personal digital assistant 163. Data can also be transmitted from hub 160 over an ethernet or internet line to a network 165, or to a laptop or other computer 167. The system can also comprise a video camera 170 directed toward the machine and connected to the computer 80 via a universal serial bus, or USB. The video image from the camera 170 can be observed by users of either laptop or PC computer 167 or network 165. The video image can also come from a webcam. It may be seen that the system illustrated in FIG. 5 may be used for one machine as shown, or it may be used to monitor, operate, and control several machines in a single facility simultaneously. In such an arrangement, each machine would have its own computer 80, its own video camera 170, and its own website or other output.

A plant manager can get operational updates of a machine either over the network or by a personal digital assistant. In one embodiment, each machine can be set up as its own website or uniform resource locator (URL) by which information can be obtained and downloaded from the internet. A person away from the plant could then log onto the website and review the data and images pertaining to that machine to facilitate remote debugging of the machine, or to adjust the operational parameters such as for a product change.

Figure 6:
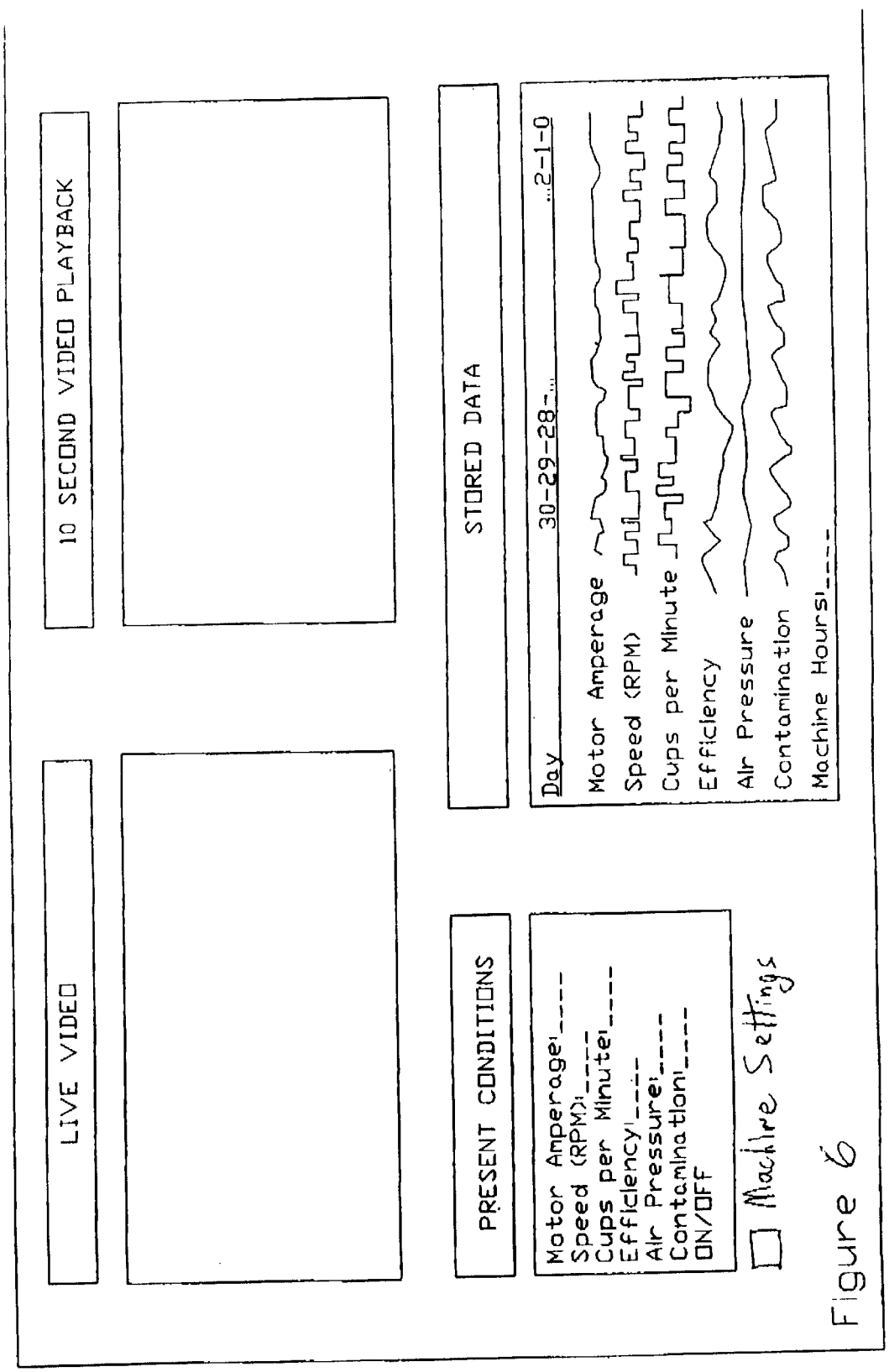
FIG. 6 is a screen display as may be presented to a remote user.

FIG. 6 shows information that a remotely located computer might wish to access. As an illustration, a remote technician can view data of the present running conditions in a graphical format. The remote technician may also view what has occurred over the last thirty days relative to the machine or view live video of the machine and plant environment to better assess a situation. Ten seconds of this video signal may be stored so that it could be replayed at a slower speed to be help in discerning any issues. Machine settings can be polled to see if anything unusual has occurred.

Machine status is updated in real-time or near real-time through the sensors, webcam and output from the human-machine interface (HMI). An on-board data logger keeps track of thirty days of data. The webcam signal may be "piggybacked" on the digital sensor/HMI data so that a signal may be sent through an internet connection for viewing at a remote site.

Such remote diagnostics and menu manipulation allow more efficient debugging and reduce machine downtime by allowing an expert to be available via the internet. Also, the menu and profiles can be updated through the internet, thereby allowing machine operators better possible menus and profiles. This reduces travel expenses because it does not require at-site intervention. Because the technician does not have to be on location, he could monitor several machines at once even if they are located at different locations. A plant or floor manager could tie into the system to obtain daily production figures, efficiency and up-time. Such a system also reduces the expense in hiring a third party independent contractor since they may not have to specially visit a company's plant to address issues.

Figure 7:
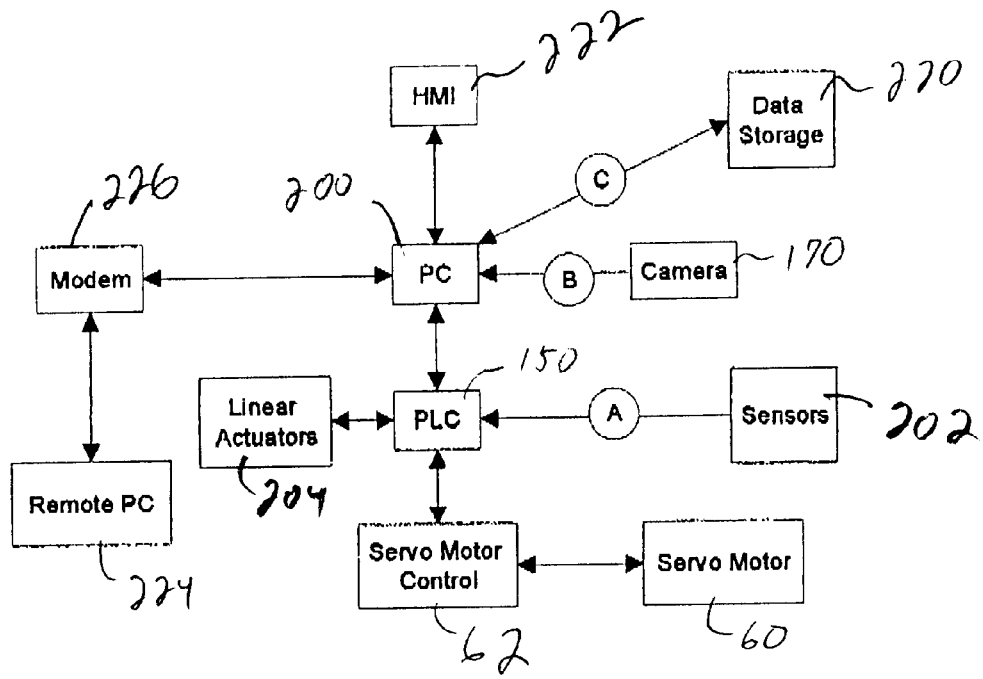
FIG. 7 is a block diagram illustrating data flow among components that may be used in the system.
Figure 9:
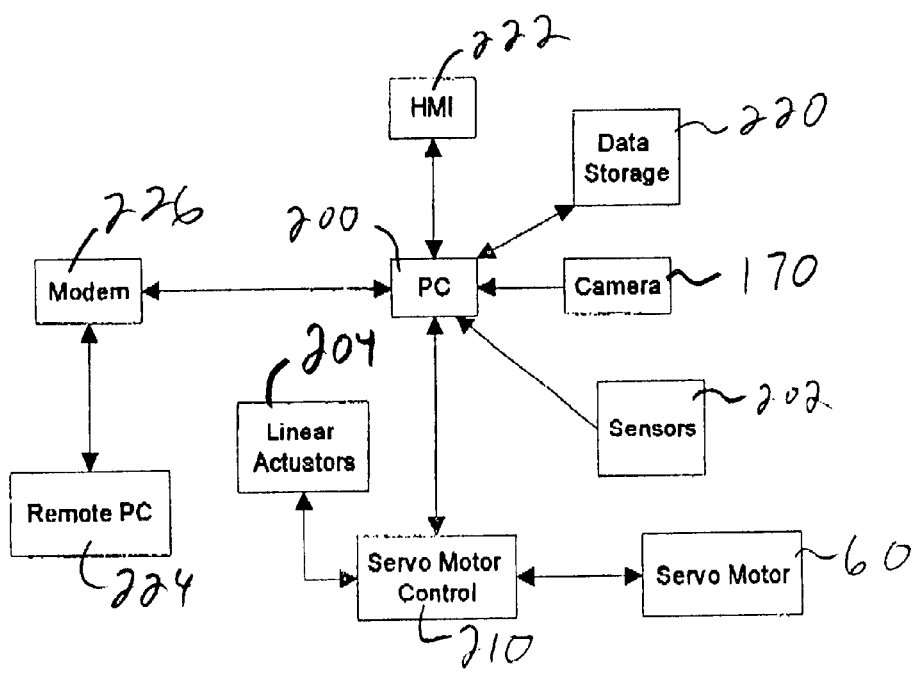
FIG. 9 is a block diagram illustrating an alternate configuration of the system shown in FIG. 7.

FIG. 7 depicts data being transmitted among different components of the system. The data is used, among other purposes, to allow the system to have pre-programmed menu selectable electric, control and pneumatic ports. Recipe data is stored in a data storage unit 220 relative to a machine function for each product being filled and is provided to computer 200 upon request. The computer 200 provides control instructions based upon the recipe data. For example, when a particular cup size and filled medium are being run, the recipe data sets all filler timing functions. The computer 200 may also provide screen displays to visually instruct the operator in installing the appropriate operators/attachments. Different recipes may be retrieved when needed to operate the equipment. This eliminates set-up time when converting to various sizes and components.

Other data that may be exchanged between the computer 200 and data storage unit 220 include:

sensor data for equipment over the last thirty days
current sensor data
current machine settings
equipment inventory
sanitation procedures
maintenance log
sanitation log
machine speed
elapsed time
time of day
conveyor speed
settings and timings of operations
troubleshooting guide
product being filled
pre-start check list
machine control run data
product set-up information
software driven limits
etc.

In addition to this information, camera 170 provides visual information to the computer 200, and the sensors 202 provide such information as air pressure, internal temperature, moisture content, amperage draw, run time, and efficiency. The information available on the computer 200 may also be provided to operators via the HMI 222 as well as to remote computers 224 via modems 226 (or other types of network connections). To more efficiently store and provide access to the information, many different data structure formats may be used by the computer 200 and/or the data storage unit 220 (as shown for example in FIG. 8).

To illustrate the wide scope of operations that the computer 200 may perform with the information, the computer 200 can use the stored software driven limits to ensure that the equipment is operated within proper ranges. The software driven limits keep operators from entering values that are outside of the process capability and act as a fail-safe to eliminate operator-induced machine crashes and inefficient operation. As yet another example of the wide use of the information by the computer 200, the computer 200 can automatically return to the previous set-up in case of out-of-range data being input by an operator. The computer 200 can also output proper warning and guidelines displayed on the HMI 222 which act as a fail-safe to downtime due to inexperience or lack of knowledge.

The information generated and stored by the system enhances compliance with governmental rules or international standards. The computer 200 allows an operator to access safety, maintenance, sanitation, and other types of check lists with associated operator signoffs. This checklist process generates records that may be submitted in response to governmental inspections or audits.

Figure 8:
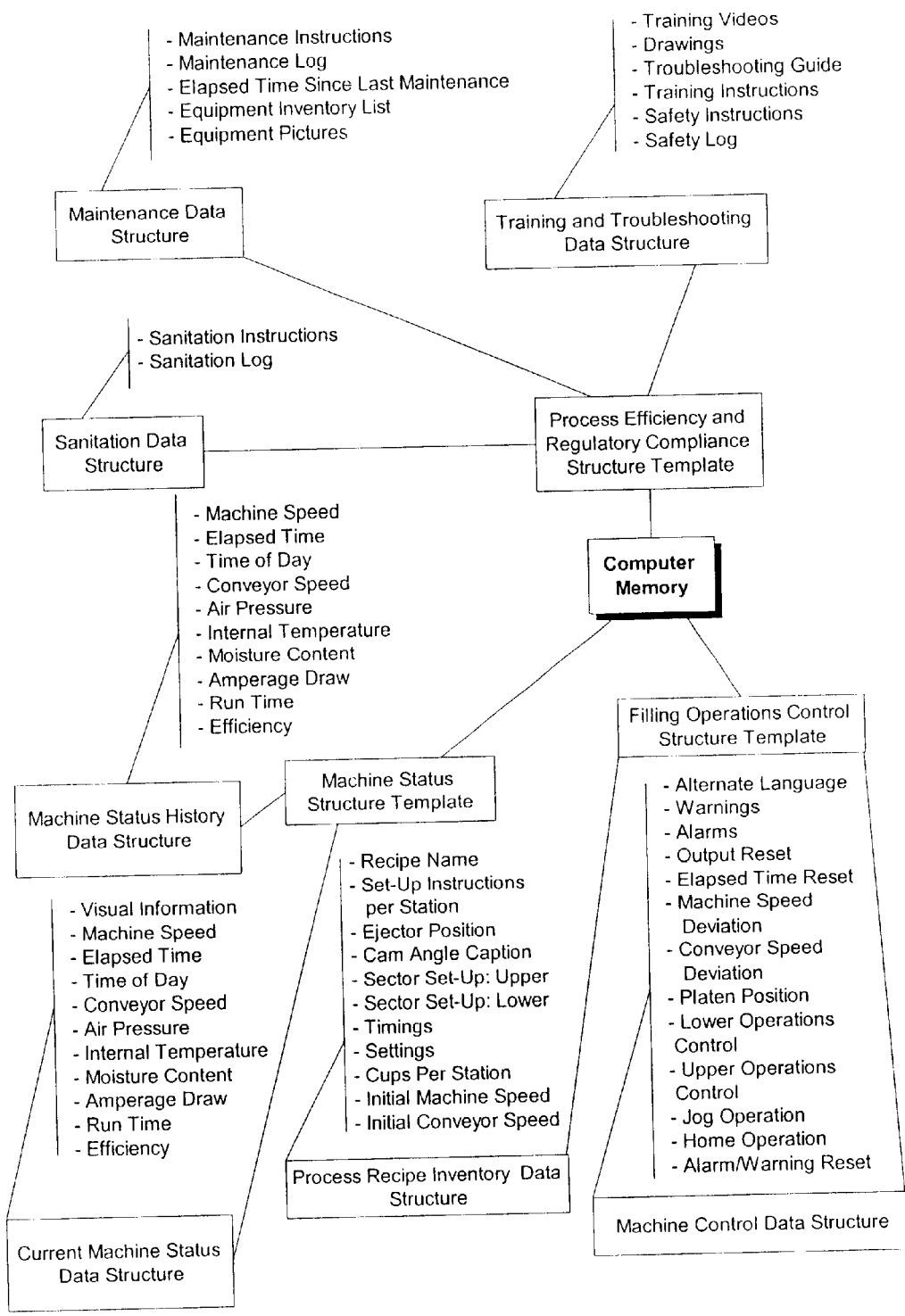
FIG. 8 is a block diagram illustrating data structures that may be used in the system.

FIG. 7 depicts additional components that interface with computer 200. PLC 150 is controlled by computer 200. The PLC 150 transmits instructions to linear actuators 204 and controller 62. The PLC 150 receives input from linear actuators 204, controller 62, computer 200, and electronic sensors 202 on the operating units in order to perform its operations. However, it should be understood that different configurations may be used. For example, FIG. 8 illustrates a servo motor control 210 that does not require a separate PLC and is able to directly interface with computer 200 and linear actuators 204.

Because of the HMI 222 and servo motor control 62, the filler machine is less hazardous than other systems when dealing with emergency stops. As shown by the flowchart of FIG. 10, when the emergency stop is activated, the servo motor de-energizes becoming free-wheeling. At the same time, all pneumatic and electrical devices on the filler de-energize so that they remove any pressure on life and limb. The filler automatically finds its home position so that it will start up at the right position after the obstruction is removed and the command is given. The HMI 222 performs the following function which makes the filler less hazardous: a red blinking screen active sector is provided when the machine is in 'E' (emergency) stop condition. Restarting can only occur after the 'E' condition is acknowledged and the screen reset.

Figure 11A:
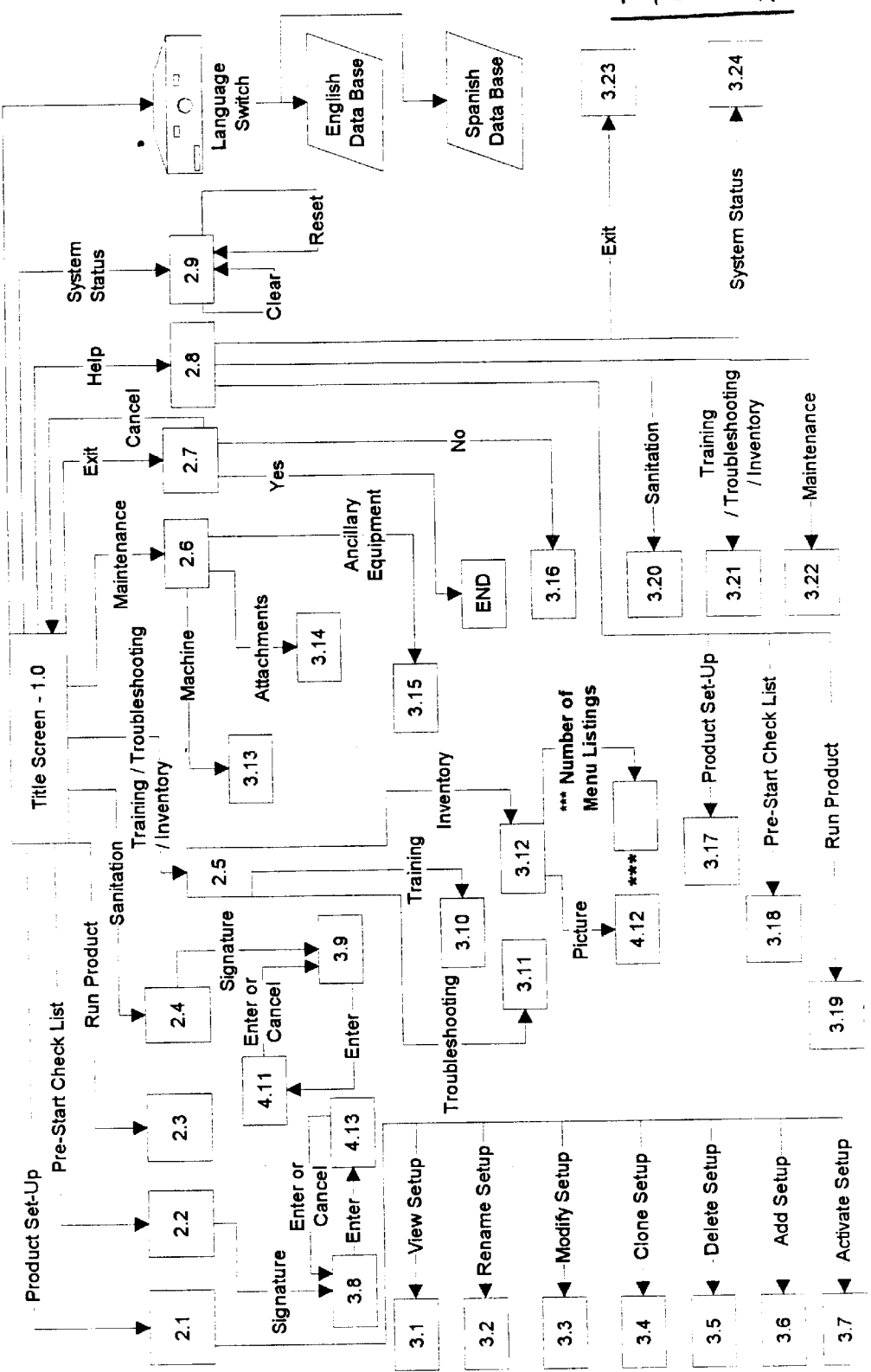
FIGS. 11A–11B are block diagrams depicting screen invocation structure.
Figure 11B:
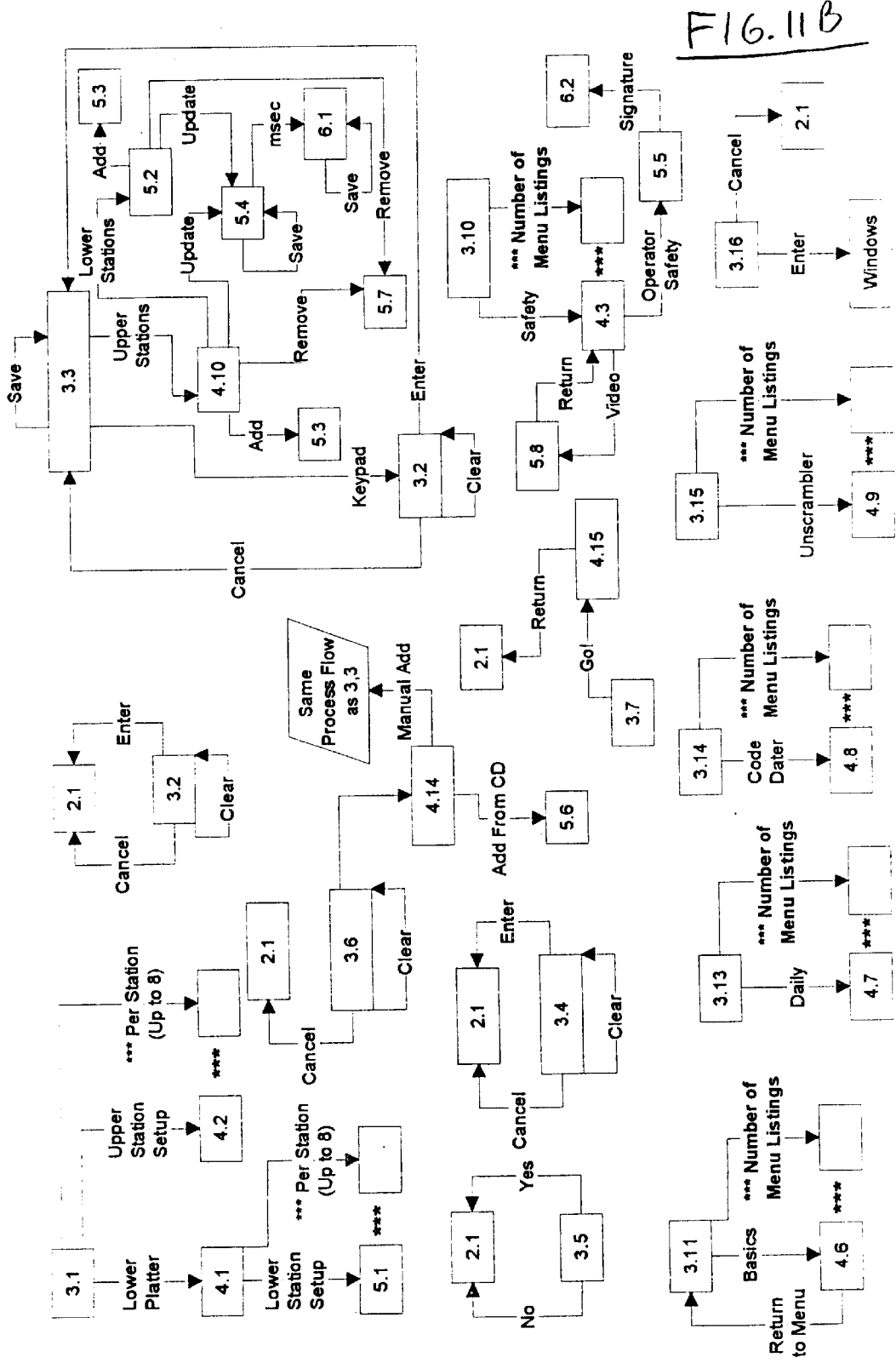

Many different types and formats of HMIs may be used. FIGS. 12–68 provide an example of an HMI that may be used with the system. FIGS. 11A–11B show the flow among the screens depicted in FIGS. 12–68. As shown in FIG. 11A, title screen 1.0 is the entry screen for the exemplary HMI. FIG. 12 depicts screen 1.0 which allows a user to access second level screens, such as the product setup screen 2.1, the pre-start checklist screen 2.2, the run product screen 2.3, the sanitation screen 2.4, the training/troubleshooting/inventory screen 2.5, and the maintenance screen 2.6. (Each of these screens will be discussed in turn below.) Screen 1.0 provides an indicator 400 whose color varies depending upon the status of the system. For example, a green color indicates that the system is within an acceptable operational state. A yellow color indicates a warning state wherein an improper condition has been detected but is not sufficient enough to substantially impact the operation of the machine. A red color indicates that the machine will not operate.

The exit button on screen 1.0 allows a user to access screen 2.7 as shown in FIG. 19 so that the user may exit the system. The help button activates screen 2.8. An alternative language switch button is provided in the event that a user would like to see the menu displayed in a different language such as Spanish. For example when an alternative language is selected, the Spanish database of FIG. 11A is utilized instead of the English database.

With respect to the secondary level screens of the title screen 1.0, FIG. 13 depicts screen 2.1 wherein a user is allowed to select an action and a product. For example, the user may select the view setup action as well as the product P416 in order to view the setup associated with product P416. The return button allows the user to go to the previous screen, and activation of the GO button completes the action/product selection by the user.

Activation of the view setup action button on screen 2.1 activates screen 3.1 which is shown in FIG. 22. With reference to FIG. 22, screen 3.1 in this example displays the setup associated with product P416. Screen 3.1 shows what components are positioned where on the upper platter. Other setup information may be provided, such as cups per stations, cups per minute, ejector position, and cam angle. Activation of the lower platter button on the screen provides screen 4.1 of FIG. 46 which shows lower platter information. Through screen 4.1, lower station setup data is accessible and is displayed in screen 5.1 of FIG. 59. Screen 5.1 shows the settings data as well as the instructions to different ports. Activation of the next button on screen 5.1 allows an operator to go to the next attachment on the lower platter's list. Similar type of information is accessible for the upper station setup as shown in screen 4.2 of FIG. 47.

If the user selected the rename setup action button on screen 2.1 of FIG. 13, then the screen 3.2 of FIG. 23 is shown to the user. Screen 3.2 allows a user to utilize a keyboard in order to rename the setup.

If the user had selected on screen 2.1 of FIG. 13 the modify setup button, then screen 3.3 of FIG. 24 is shown so that a user may modify the machine setup. With reference to FIG. 24, a user for a selected product can view the current settings and enter in new values. For example, the user is provided with the information that the current cups per station setup value is 2. The user may enter a new value for this field. Setups for upper and lower stations may be modified through screen 4.10 of FIG. 53 and screen 5.2 of FIG. 60 wherein the operator selects the action and the appropriate platter location.

If a user had selected the clone setup button on screen 2.1 of FIG. 13, then screen 3.4 of FIG. 25 is provided to the user. Screen 3.4 provides a keyboard wherein a user may enter a setup or recipe name that has been previously stored so that it may be retrieved. The retrieved settings are then used as setup information for a different product.

If the user had selected the delete setup button on screen 2.1 of FIG. 13, then screen 3.5 of FIG. 26 is provided to the user. Screen 3.5 may optionally make the user confirm whether they wish to delete the setup for a particular product.

If the user had selected the add setup button of screen 2.1 of FIG. 13, then the add setup interface of screen 3.6 is provided as depicted in FIG. 27. Screen 3.6 provides a keyboard wherein a user may enter a recipe name that is to be added to the product setup database. Once the recipe name has been entered, the user may utilize one or more of the other interfaces (such as screen 4.14 of FIG. 57 or screen 3.3 of FIG. 24) to provide values for the new recipe.

If the user selects the activate setup button of screen 2.1 on FIG. 13, then a message appears and informs the user the operator that the selected product setup has been activated. This is shown by the activation messages appearing in screen 3.7 of FIG. 28 and screen 4.15 of FIG. 58.

If a user had selected the pre-start checklist button located on the title screen 1.0 of FIG. 12, then screen 2.2 of FIG. 14 is shown to the user. With reference to FIG. 14, screen 2.2 provides instructions on what the operator should do prior to starting and operating the equipment. Safety instructions as well as maintenance instructions may be provided by screen 2.2. Screen 3.8 of FIG. 29 is provided to the user in order to verify that the operator has successfully completed all the checklist steps. The employee may enter in his or her employee number for identification. This signed checklist is automatically date and time stamped. The operator may use the keypad provided by screen 4.13 as shown on FIG. 56 in order to enter his or her employee number. This verification may be utilized for such situations as to more efficiently provide compliance documentation to government regulations or to international standards organizations.

Figure 15:

If the user had selected the run product button on the title screen 1.0, then screen 2.3 of FIG. 15 is provided to the user. With reference to FIG. 15, screen 2.3 allows an operator to view operational parameters as well as to change them. Additionally, control panel buttons are provided to the user in order to control operation of the equipment. For example, the ON button starts the filler rotation whereas the off button stops the rotation. Optionally the ON button may have a color that depicts a particular state associated with the equipment. A green color may indicate that the equipment is ready to begin operation, while a yellow color may indicate that the machine must be homed before running. A home button is provided in order to home the machine, and a jog button acts upon the machine as long as the jog button is pushed. Upper operation buttons and lower operation buttons are also provided so that an operator can turn the attachments on and off. Conveyor speed of the equipment may be varied via the conveyor toggle buttons. Toggle buttons are also provided that control the speed of the machine. Status information may also be provided, such as the number of cups filled since a particular time. This value may be provided in the output field.

If the operator had selected the sanitation button on title screen 1.0, then screen 2.4 of FIG. 16 is provided to the user. With reference to FIG. 16, screen 2.4 provides instructions to the user as to how to perform sanitation and cleanup for the equipment after the equipment has been operated. The operator verifies that the procedure has been performed through screen 3.9 of FIG. 30. The employee may enter his or her employee number via screen 4.11 of FIG. 54.

Figure 66:
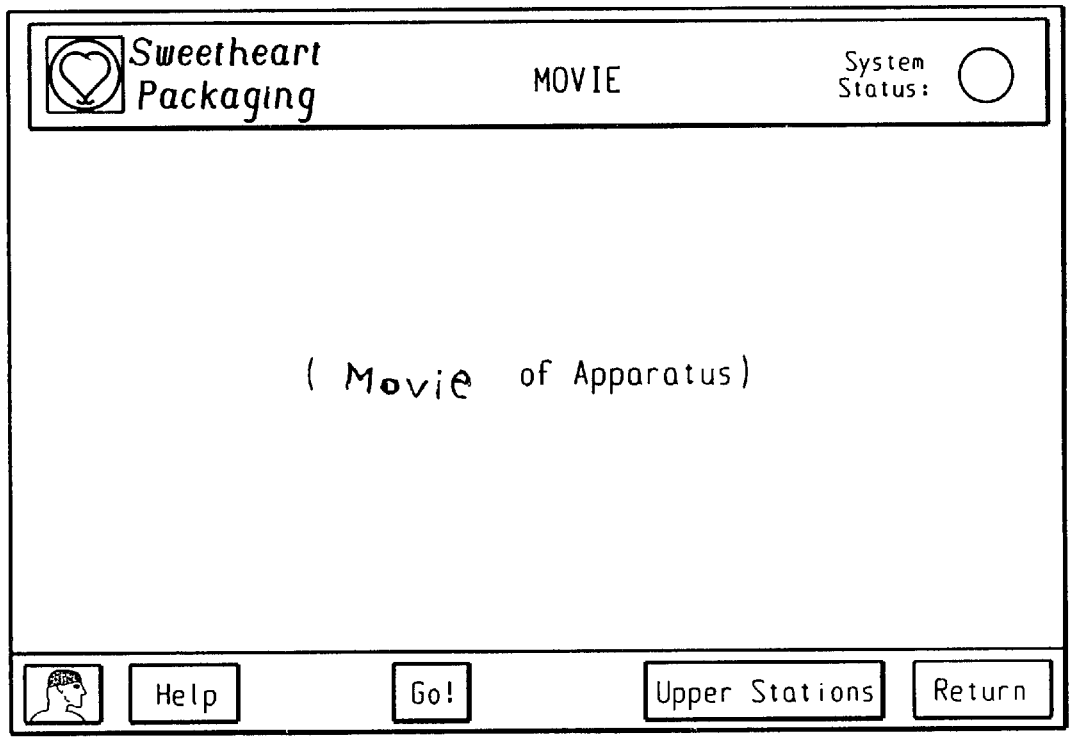

If the operator selects the training/troubleshooting/inventory button on the title screen 1.0, then screen 2.5 appears as shown in FIG. 17. From screen 2.5, the operator can access the training screen 3.10 as shown on FIG. 31. With reference to FIG. 31, the operator may be trained on a number of items related to the equipment. For example, training may include safety, machine operation, attachment operation, ancillary equipment operation, sanitation, machine repair, attachment repair, and ancillary equipment repair. The training may include actual information about a particular item as well as video and/or audio information being provided to the operator. As an illustration, if the operator selects on screen 3.10 to view training about safety, then screen 4.3 as shown on FIG. 48 is provided to the user. More detailed items about safety are shown to the operator, such as video on machine operation. Other items may include operator safety instructions, maintenance safety instructions, OSHA requirements, and FDA/3A requirements. If the operator selects to view a video on machine operation, then screen 5.8 of FIG. 66 is provided to the operator. The operator may manipulate the video through the controls provided on screen 5.8 in order to view the video at the operator's own pace. The operator may also view safety instructions as shown on screen 5.5 of FIG. 63. The operator verifies that the operator has undergone such safety training through the screen 6.2 shown on FIG. 68.

The operator may review information as to how to troubleshoot problems associated with the equipment. Screen 3.11 of FIG. 32 allows the user to access detailed troubleshooting information. Such troubleshooting items that may be provided to the operator include troubleshooting basics, machine issues, attachment issues, ancillary equipment issues, and other issues. As an illustration, if the user selects to review troubleshooting basics, then screen 4.6 of FIG. 49 is provided to the user wherein textual instructions are shown to the operator. It should be understood that other types of information may be provided to the operator such as providing troubleshooting basic videos and/or audio information.

Figure 55:
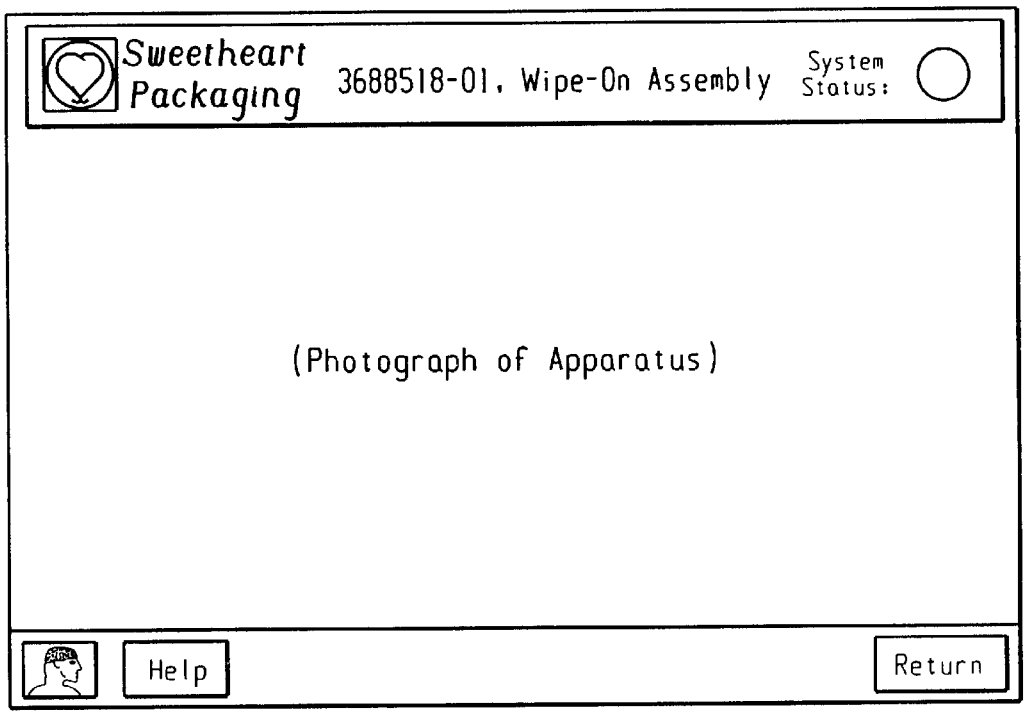

The operator may also view inventory information as shown in screen 3.12 of FIG. 33. As an illustration, the operator can select on screen 3.12 the wipe on assembly and be provided with a picture as shown in screen 4.12 of FIG. 55.

The operator may also wish to access maintenance data through screen 2.6 as shown on FIG. 18. The operator can select different items on screen 2.6 in order to view the maintenance requirements for the different items. For example, the operator may select the machine maintenance item and be presented with screen 3.13 of FIG. 34. Screen 3.13 depicts different maintenance items that are to be performed at different times. As an illustration, screen 4.7 of FIG. 50 provides detailed information about daily maintenance items to be performed on the machine. Screen 3.14 of FIG. 35 allows an operator to review different maintenance procedures associated with attachments such as cup dispensers, lid dispensers, etc. As an illustration, screen 4.8 of FIG. 51 provides maintenance information for the code dater attachment. Screen 3.15 of FIG. 36 allows an operator to access detailed information about ancillary equipment. As an illustration, the operator may view detailed maintenance information about the unscrambler ancillary equipment via screen 4.9 shown on FIG. 52.

The operator may access help information from the title screen 1.0 by activating the help button. This generates screen 2.8 as shown on FIG. 20. The operator is presented on screen 2.8 with a number of help items, such as product set-up help, pre-start checklist help, run product help, sanitation help, training/troubleshooting/inventory help, maintenance help, exit help, system status help. As an illustration, screen 3.17 of FIG. 38 is provided to the user when the user requests product set-up help. Screen 3.17 allows the user to access help information about the operations that an operator can perform relative to the product set-up screen 2.1. Screen 3.18 of FIG. 39 and screen 3.19 of FIG. 40 respectively provide help for the pre-start checklist screen 2.2 and the run product screen 2.3. Screen 3.20 of FIG. 41, screen 3.21 of FIG. 42, and screen 3.22 of FIG. 43 respectively provide help information associated with the sanitation screen 2.4, the training/troubleshooting/inventory screen 2.5, and the maintenance screen 2.6. Screen 3.23 of FIG. 44 and screen 3.24 of FIG. 45 respectively provide help for the exit screen 2.7 and the systems status screen of 2.9.

Systems status information may also be accessed through title screen 1.0. Screen 2.9 of FIG. 21 shows an example of systems status information. In this example, shown in screen 2.9, alarm and warning information is shown. This information is useful in many situations, such as when an operator trying to discern whether a pattern exists for a machine that is continually breaking down. This information is also of interest to a person who is remotely attempting to monitor and remedy equipment problems. Still further, the information may be used to assess statistical operational data such as mean time between failure for pieces of equipment. An operator is allowed to both clear and reset the status of the system through screen 2.9.

While examples have been used to disclose the invention, including the best mode, and also to enable any person skilled in the art to make and use the invention, the patentable scope of the invention is defined by the claims, and may include other examples that occur to those skilled in the art.

It is claimed as the invention:

1. A system for controlling food product packaging machines, comprising:
   a data store that stores recipe data configurations, wherein a recipe data configuration specifies how a food product packaging machine is to be configured for a preselected food packaging item;
   a computer having a data pathway to the data store so that the recipe data may be provided to the computer;
   a human-machine interface that is provided by the computer to a user, said human-machine interface displaying the recipe data configurations to the user,
   wherein selection of a first recipe configuration by the user through the human-machine interface configures a food product packaging machine to handle a first food packaging item, wherein selection of a second recipe by the user through the human-machine interface reconfigures the food product packaging machine to handle a different food packaging item,
   wherein the data store includes software driven limits, wherein the computer uses the software driven limits to prevent the user from entering values outside the software driven limits during configuration of the food product packaging machine.

2. The system of claim 1 wherein upon occurrence of an out-of-range data situation involving the reconfigured food product packaging machine, the computer returns the food product packaging machine to the configuration specified by the first recipe data configuration.

3. The system of claim 1 wherein the human-machine interface is used in response to an emergency stop.

4. The system of claim 1 wherein a servo motor associated with the food packaging machine de-energizes due to the emergency stop, thereby becoming free-wheeling.

5. The system of claim 1 wherein upon occurrence of an out-of-range data situation involving the reconfigured food product packaging machine, the computer automatically returns the food product packaging machine to the configuration specified by the first recipe data configuration.

6. The system of claim 5 wherein the computer displays warning information on the human-machine interface to a user after occurrence of the out-of-range data situation.

7. The system of claim 1 wherein the data store includes diagnostic-related data related to operation of the food packaging machine, said system further comprising:

a remote computer that accesses through a network connection the diagnostic-related data, wherein the remote computer is used to evaluate the food packaging machine based upon the accessed diagnostic-related data.

8. The system of claim 7 wherein the diagnostic-related data comprises diagnostic-related data means.

9. The system of claim 7 wherein the diagnostic-related data comprises a video data that is substantially in near real-time, said video data being related to the food packaging machine.

10. The system of claim 7 wherein the diagnostic-related data comprises data in a graphical format that is representative of substantially near-real time operation data of the food packaging machine.

11. The system of claim 7 wherein the diagnostic-related data comprises historical data associated with the food packaging machine.

12. The system of claim 11 wherein the remote computer modifies at least one of the recipe data configurations so that a user may operate a food packaging machine in accordance with the modified recipe data configuration.

13. The system of claim 1 wherein the human-machine interface generates data for a check list, wherein the user performs a signoff with respect to the check list through the human-machine interface.

14. The system of claim 13 wherein the check list is related to maintenance of the food packaging machine.

15. The system of claim 13 wherein the check list is related to sanitation of the food packaging machine.

16. The system of claim 15 wherein the check list is related to maintenance of the food packaging machine.

17. The system of claim 16 wherein the signed off checklist is used to show compliance with a governmental regulation during a governmental inspection.

18. The system of claim 16 wherein the signed off checklist is used to show compliance with an international standards organization.

19. The system of claim 16 wherein the signed off checklist is used to show compliance with a governmental regulation during a governmental audit.

20. The system of claim 16 wherein the signed off checklist is used to show compliance with a governmental regulation.

21. A method for controlling food product packaging machines, comprising the steps of:

storing in a data store recipe data configurations, wherein a recipe data configuration specifies how a food product packaging machine is to be configured for a preselected food packaging item;

providing a computer having a data pathway to the data store so that the recipe data may be provided to the computer;

providing a human-machine interface to a user so that the recipe data configurations may be displayed to the user, wherein selection of a first recipe configuration by the user through the human-machine interface configures a food product packaging machine to handle a first food packaging item, wherein selection of a second recipe by the user through the human-machine interface reconfigures the food product packaging machine to handle a different food packaging item, wherein the data store includes software driven limits, wherein the computer uses the software driven limits to prevent the user from entering values outside the software driven limits during configuration of the food product packaging machine.

* * * * *